United States Patent
Laughman et al.

(10) Patent No.: US 11,316,193 B2
(45) Date of Patent: Apr. 26, 2022

(54) LITHIUM BOROSILICATE GLASS AS ELECTROLYTE AND ELECTRODE PROTECTIVE LAYER

(71) Applicant: Ilika Technologies Limited, Southampton (GB)

(72) Inventors: David Michael Laughman, Southampton (GB); Christopher Edward Lee, Southampton (GB); Laura Mary Perkins, Southampton (GB); Isabel Alexandra Domingues Tarroso Gomes, Southampton (GB); Brian Elliott Hayden, Southampton (GB)

(73) Assignee: Ilika Technologies Limited, Romsey (GB)

( * ) Notice: Subject to any disclaimer, the term of this patent is extended or adjusted under 35 U.S.C. 154(b) by 163 days.

(21) Appl. No.: 16/309,978

(22) PCT Filed: Jun. 12, 2017

(86) PCT No.: PCT/GB2017/051705
§ 371 (c)(1),
(2) Date: Dec. 14, 2018

(87) PCT Pub. No.: WO2017/216532
PCT Pub. Date: Dec. 21, 2017

(65) Prior Publication Data
US 2019/0341652 A1  Nov. 7, 2019

(30) Foreign Application Priority Data

Jun. 15, 2016 (GB) .................... 1610419
Sep. 9, 2016 (GB) .................... 1615383
Nov. 4, 2016 (GB) .................... 1618651

(51) Int. Cl.
| | | |
|---|---|---|
| *H01M 10/0562* | (2010.01) | |
| *H01M 4/131* | (2010.01) | |
| *H01M 4/66* | (2006.01) | |
| *C03C 3/064* | (2006.01) | |
| *H01M 4/04* | (2006.01) | |
| *H01M 4/134* | (2010.01) | |
| *H01M 4/1391* | (2010.01) | |
| *H01M 4/1395* | (2010.01) | |
| *H01M 4/38* | (2006.01) | |
| *H01M 4/505* | (2010.01) | |
| *H01M 10/0525* | (2010.01) | |

(52) U.S. Cl.
CPC ......... *H01M 10/0562* (2013.01); *C03C 3/064* (2013.01); *H01M 4/0423* (2013.01); *H01M 4/131* (2013.01); *H01M 4/134* (2013.01); *H01M 4/1391* (2013.01); *H01M 4/1395* (2013.01); *H01M 4/382* (2013.01); *H01M 4/505* (2013.01); *H01M 4/661* (2013.01); *H01M 10/0525* (2013.01); *H01M 2300/0071* (2013.01)

(58) Field of Classification Search
CPC ......... H01M 10/0562; H01M 10/0525; H01M 4/04; H01M 4/131; H01M 4/134; H01M 4/1391; H01M 4/1395; H01M 4/38; H01M 4/505; H01M 4/66; H01M 4/136; H01M 4/463; H01M 10/052; H01M 4/1393; H01M 4/525; H01M 4/523; H01M 4/387; H01M 4/382; H01M 4/0423; H01M 4/661; H01M 4/502; H01M 4/62; H01M 4/388; H01M 4/133; H01M 4/466; H01M 4/0428; H01M 4/386; H01M 4/1397; C03C 3/064; C03C 3/089; C03C 17/02
See application file for complete search history.

(56) References Cited

U.S. PATENT DOCUMENTS

| | | | |
|---|---|---|---|
| 4,374,162 A | 2/1983 | Takagi | |
| 4,933,058 A | 6/1990 | Bache | |
| 5,016,563 A | 5/1991 | Murakami et al. | |
| 5,128,007 A | 7/1992 | Matsunaga et al. | |
| 5,338,625 A | 8/1994 | Bates et al. | |
| 5,804,054 A | 9/1998 | Bhattacharya et al. | |
| 6,017,654 A | 1/2000 | Kumta et al. | |
| 6,214,061 B1 * | 4/2001 | Visco | H01M 4/04 29/623.5 |
| 6,632,563 B1 | 10/2003 | Krasnov | |
| 6,863,699 B1 | 3/2005 | Krasnov et al. | |
| 6,982,132 B1 | 1/2006 | Goldner et al. | |

(Continued)

FOREIGN PATENT DOCUMENTS

| | | |
|---|---|---|
| CN | 1773763 A | 5/2006 |
| CN | 101479403 A | 7/2009 |

(Continued)

OTHER PUBLICATIONS

Sahan et al. Journal of Alloys and Compounds., 2011 pp. 4235-4424 (Year: 2011).*
Joo et al. Solid State Ionic, 160 (2003) 51-59 (Year: 2003).*
Kim et. al. Journal of Non-Crystalline Solids 357 (2011) 2863-2867 (Year: 2011).*
Meikhail et. al. J. Phys. D: Appl. Phys. 26 (1993) 1125-1129. (Year: 1993).*
Ren et al.; "Oxide Electrolytes for Lithium Batteries", Journal of the American Ceramic Society, 98 [12] (2015) 3603-3623.

(Continued)

*Primary Examiner* — Alexander Usyatinsky
(74) *Attorney, Agent, or Firm* — Renner, Otto, Boisselle & Sklar, LLP

(57) ABSTRACT

A lithium borosilicate composition, consisting essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass, is disclosed.

3 Claims, 7 Drawing Sheets

(56) References Cited

U.S. PATENT DOCUMENTS

| | | | |
|---|---|---|---|
| 7,883,800 B2 | 2/2011 | Vinatier et al. | |
| 10,490,805 B2 | 11/2019 | Smith | |
| 2001/0032666 A1 | 10/2001 | Jenson | |
| 2001/0041294 A1* | 11/2001 | Chu | H01M 4/0452 |
| | | | 429/231.9 |
| 2003/0186128 A1 | 10/2003 | Singh | |
| 2004/0058237 A1* | 3/2004 | Higuchi | C23C 14/32 |
| | | | 429/209 |
| 2004/0258984 A1 | 12/2004 | Ariel | |
| 2005/0016458 A1 | 1/2005 | Zhang | |
| 2005/0130032 A1 | 6/2005 | Krasnov et al. | |
| 2005/0147890 A1* | 7/2005 | Shembel | H01M 10/0562 |
| | | | 429/322 |
| 2009/0026065 A1 | 1/2009 | Nukeaw | |
| 2009/0057136 A1 | 3/2009 | Wang et al. | |
| 2009/0081554 A1 | 3/2009 | Takada | |
| 2010/0068617 A1 | 3/2010 | Bedjaoui et al. | |
| 2010/0104942 A1 | 4/2010 | Lange | |
| 2010/0261071 A1 | 10/2010 | Lopatin | |
| 2012/0058280 A1 | 3/2012 | Chung | |
| 2012/0058380 A1 | 3/2012 | Wang et al. | |
| 2012/0237835 A1 | 9/2012 | Yada | |
| 2012/0319034 A1 | 12/2012 | Awano | |
| 2013/0011738 A1 | 1/2013 | Zhou | |
| 2013/0136981 A1* | 5/2013 | Peuchert | H01M 50/431 |
| | | | 429/188 |
| 2013/0189588 A1 | 7/2013 | Yada et al. | |
| 2014/0001412 A1* | 1/2014 | Munnangi | H01M 4/364 |
| | | | 252/506 |
| 2014/0178750 A1* | 6/2014 | Anji Reddy | H01M 6/16 |
| | | | 429/188 |
| 2015/0203975 A1 | 7/2015 | Hoormann | |
| 2016/0340772 A1 | 11/2016 | Smith et al. | |
| 2016/0340784 A1 | 11/2016 | Hayden et al. | |

FOREIGN PATENT DOCUMENTS

| | | | |
|---|---|---|---|
| CN | 106495671 | | 3/2017 |
| DE | 10342974 | | 4/2005 |
| DE | 103 55 236 A1 | | 6/2005 |
| EP | 0454499 A2 | | 10/1991 |
| EP | 0454499 B1 | | 11/1996 |
| EP | 1305838 | | 2/2007 |
| EP | 1900845 | | 3/2008 |
| EP | 2824738 A1 | | 1/2015 |
| GB | 1595632 A | | 8/1981 |
| GB | 2493020 A | | 1/2013 |
| GB | 2493022 | * | 1/2013 |
| GB | 2493022 A | | 1/2013 |
| JP | S63-035493 A | | 2/1988 |
| JP | H01317199 A | | 12/1989 |
| JP | H04187759 A | | 7/1992 |
| JP | H08329944 A | | 12/1996 |
| JP | 2003277915 | | 10/2003 |
| JP | 2005038844 A | | 2/2005 |
| JP | 2006-120437 | | 5/2006 |
| JP | 2006120437 A | | 5/2006 |
| JP | 2013-151721 | | 8/2013 |
| JP | 2013-187024 | | 9/2013 |
| JP | 2015-056208 | | 3/2015 |
| KR | 20030094759 A | | 12/2003 |
| KR | 20040098139 A | | 11/2004 |
| KR | 20080003679 A | | 1/2008 |
| WO | 2001073957 | | 10/2001 |
| WO | 2005035820 | | 4/2005 |
| WO | WO 2013/011326 A1 | | 1/2013 |
| WO | WO 2013/011327 A2 | | 1/2013 |
| WO | 2015/104538 A1 | | 7/2015 |
| WO | 2015/104540 A1 | | 7/2015 |
| WO | 2017/216532 | | 12/2017 |

OTHER PUBLICATIONS

Bachman et al, "Inorganic Solid-State Electrolytes for Lithium Batteries: Mechanisms and Properties Governing Ion Conduction", Chemical Reviews, 116 (2016) 140-162.

Bates et al.; "A Stable Thin-Film Lithium Electrolyte: Lithium Phosphorus Oxynitride", Journal of the Electrochemical Society 144 [2] (1997) 524-533.

Guerin et al.; "Physical Vapor Deposition Method for the High-Throughput Synthesis of Solid-State Material Libraries", Journal of Combined Chemistry, 2006, vol. 8, pp. 66-73.

Zhu et al; "First principles study on electrochemical and chemical stability of solid electrolyte-electrode interfaces in all-solid-state Li-ion batteries", Journal of Materials Chemistry A 2016 4 3253-3266; and supplementary information.

Halil Sahan et al: "Improvement of the electrochemical performance of LiMn2O4 cathode active material by lithium borosilicate (LBS) surface coating for lithium-ion batteries", Journal of Alloys and Compounds., vol. 509, No. 11, Jan. 14, 2011 (Jan. 14, 2011).

N.S. Saetova et al: The influence of lithium oxide concentration on the transport properties of glasses in the Li2O—B2O3—SiO2 system 11 , Journal of Non-Crystalline Solids., vol. 443, Apr. 22, 2016 (Apr. 22, 2016), pp. 75-81.

International Search Report and Written Opinion for corresponding Patent Application No. PCT/GB2017/051705 dated Aug. 2, 2017.

Halil Sahan et al: "Improvement of the electrochemical performance of LiMn2O4 cathode active material by lithium borosilicate (LBS) surface coating for lithium-ion batteries", Journal of Alloys and Compounds, vol . 509, No. 11, Jan. 14, 2011 (Jan. 14, 2011), pp. 4235-4241, XP055394524, CH ISSN: 0925-8388, DOI: 10.1016/j.jallcom.2011.01.054, abstract, figure 1, p. 4236, lines 58-61.

N.S. Saetova et al: The influence of lithium oxide concentration on the transport properties of glasses in the Li2O—B2O3—SiO2 system11 , Journal of Non-Crystalline Solids., vol. 443, Apr. 22, 2016 (Apr. 22, 2016), pp. 75-81, XP055394526, NL ISSN: 0022-3093, DOI: 10.1016/j.jnoncrysol.2016.04.025, the whole document.

Intellectual Property Office Search Report under Section 17 for Priority Application No. GB 1618651.2 dated May 18, 2017.

Samuneva et al. Structure and optical properties of niobium silicate glasses. Journal of Non-crystalline solids. vol. 129, Issues 1-3. Mar. 1991, pp. 54-63.

Liu, et al., "Mechanism of lithium storage in Si—O—C ccomposite anodes," Journal of Power Sources 196, 2011, pp. 10667-10672, Changsha, People's Republic of China.

Jin, et al., "Raman Studies of Lithium Borophosphate Glasses," Journal of Non-Crystalline Solids 112, 1989, pp. 145-150, North-Holland, Amsterdam.

Wang, et al., "Structural role of lead in lead silicate glasses derived from XPS spectra," Journal of Non-Crystalline Solider 194, 1996, pp. 129-134.

Shiraishi, et al., "Study of the Surface Composition of Highly Smooth Lithium Deposited in Various Carbonate Electrolytes Containing HF", American Chemical Society, Langmuir, vol. 13, No. 13, 1997, pp. 3542-3549.

Rinke, et al., The mixed network former effect in glasses: solid state NMR and XPS structural studies of the glass system $(Na_2O)_x(BPO_4)_{1-x}$, Phys. Chem. Chem. Phys., www.rsc.org/pccp, 2011, 13, pp. 6552-6565.

Raskar, et al., The Mixed-Network Former Effect in Phosphate Glasses: NMR and XPS Studies of the Connectivity Distribution in the Glass System $(NaPO_3)_{1-x}(B_2O_3)_x$, J. Phys. Chem. C, 2008, 112, pp. 12530-12539.

Nocun, "Structural studies of phosphate glasses with high ionic conductivity," Journal of Non-Crystalline Solids, 333, 2004, pp. 90-94.

Miyachi, et al., "Analysis of SiO Anodes for Lithium-Ion Batteries," Journal of the Electrochemical Society, 152, 10, 2005, pp. A2089-A2091.

Machida, et al., "Preparation of Amorphous Films in the Systems $Li_2O$—$SiO_2$ and $Li_2O$—$B_2O_3$—$SiO_2$ by Rf-Sputtering and Their Ionic Conductivity," Yogyo-Kyokai-Shi 95, 1987, pp. 135-137.

Konijnendijk, et al., "The Structure of Borosilicate Glasses Studied by Raman Scattering," Journal of Non-Crystalline Solids, 20, 1976, pp. 193-224, North-Holland, Amsterdam.

Goodenough, "Design considerations," Solid State Ionics 69, 1994, pp. 184-198.

(56) References Cited

OTHER PUBLICATIONS

Maia, et al., Electrical Conductivity and relaxation frequency of lithium borosilicate glasses, Solid State Ionics 168, 2004, pp. 87-92.
Muralidharan, et al., "Sol-gel synthesis, structural and ion transport studies of lithium borosilicate glasses," Solid State Ionics 166, 2004, pp. 27-38.
Satyanarayanaa, et al., "Investigation of sol-gel route in the synthesis of lithium ion conducting glasses," Solid State Ionics, 86-88, 1996, pp. 543-546.
Tatsumisago, et al., "Raman spectra of rapidly quenched $Li_4SiO_4$—$Li_3BO_3$ glasses," Physics and Chem of Glasses 28, 1987, pp. 95-96.
Tatsumisago, et al., Structural Investigation of Rapidly Quenched $Li_2O$—$B_2O_3$ Glasses by Raman Spectroscopy, Yogyo-Kyokai-Shi 94 [5], 1986, pp. 464-469.
Levasseur, et al., "Elaboration and Characterization of Lithium Conducting Thin Film Glasses," Solid State Ionics 9 & 10, North Holland Publishing Company, 1983, pp. 1439-1444.
Efimov, "Vibrational spectra, related properties, and structure of inorganic glasses," Journal of Non-Crystalline Solids, 253, 1999, pp. 95-118.
Dalby, et al., "Resolution of bridging oxygen signals from O 1s spectra of silicate glasses using XPS: Implications for O and Si speciation," Geochimica et Cosmochimica Acta 71, www.elsevier.com/locate/gca, 2007, pp. 4297-4313.
Brooker, et al., "Raman and Infrared Spectral Studies of Anhydrous $Li_2CO_3$ and $Na_2CO_3$", The Journal of Chemical Physics, vol. 54, No. 11, Jun. 1, 1971, pp. 4788-4796.
Touati, et al., "Preparation and characterization of mesoporous lithium borosilicate material via the sol-gel process," Materials Science and Engineering, C, 29, 2009, pp. 1239-1244.
Muralidharan, et al., "Sol-gel synthesis, characterization and impedance studies of lithium borosilicate glass," Materials Research Bulletin, 39, Jan. 2004, pp. 1753-1762.
Touati, et al., "Structure and texture of heat-treated lithium borosilicate xerogel," Materials Chemistry and Physics, 101, 2007, pp. 352-356.
Meunier, et al., "New Positive-electrode Materials for Lithium Thin Film Secondary Batteries*," Materials Science and Engineering, B3, 1989, pp. 19-23.
Zhang, "A review of the electrochemical performance of alloy anodes for lithium-ion batteries," Journal of Power Sources, 196, 2011, pp. 13-24.
Kim, et al., "Laser-printed thick-film electrodes for solid-state rechargeable Li-ion microbatteries," Journal of Power Sources, 165, 2007, pp. 413-419.
Lee, et al., "Phase separation and electrical conductivity of lithium borosilicate glasses for potential thin film solid electrolytes," Journal of Power Sources, 162, 2006), pp. 1341-1345.
Wartena, et al., "Li-ion microbatteries generated by a laser direct-write method," Journal of Power Sources, 126, 2004, pp. 193-202.
Wang, et al., "A meso-macroporous borosilicate monolith prepared by a sol-gel method," Microporous and Mesoporous Materials, 151, 2012, pp. 250-254.
Creus, et al., "The Use of Ionic and Mixed Conductive Glasses in Microbatteries*," Materials Science and Engineering, B3, 1989, pp. 109-112.
Lee, et al., "Electrochemical performance of lithium/sulfur batteries with protected Li anodes," Journal of Power Sources, https://www.researchgate.net/publication/245105584, Jun. 2003.
Kim, et al., "Fabrication of a high lithium ion conducting lithium borosilicate glass," Journal of Non-Crystalline Solids, 357, 2011, pp. 2863-2867.
Tatsumisago, et al., "Ionic Conductivity of Rapidly Quenched Glasses with High Concentration of Lithium Ions," Journal of Non-Crystalline Solids, 95 & 96, 1987, pp. 857-864.
Tatsumisago, et al., "Preparation of Rapidly Quenched Glasses in Pseudobinary Systems Composed of Lithium Ortho-Oxosalts," Journal of the American Ceramic Society, Nov. 1983, pp. C210-C211.
Kim, et al., "High voltage stability of $LiCoO_2$ particles with a nano-scale Lipon coating," Electrochimica Acta, 56, 2011, pp. 6573-6580.

Tatsumisago, "Raman Spectra of $Li_2O$—$SiO_2$ Glasses Prepared by Rapid Quenching," The Chemical Society of Japan, Chemistry Letters, 1986, pp. 1371-1374.
Goodenough, et al., "Challenges for Rechargeable Li Batteries," Chemistry of Materials Review, 22, 2010, pp. 587-603.
Manthiram, et al., "Lithium-Sulfur Batteries: Progress and Prospects," Advanced Materials, 27, 2015, pp. 1980-2006.
Zhu, et al., "Origin of Outstanding Stability in the Lithium Solid Electrolyte Materials: Insights from Thermodynamic Analyses Based on First-Principles Calculations," ACS Applied Materials & Interfaces, 7, 2015, pp. 23685-23693.
Reddy, et al., "Metal Oxides and Oxysalts as Anode Materials for Li Ion Batteries," Chemical Reviews, 113, 2013, pp. 5364-5457.
Bates, et al., CRADA Final Report for CRADA No. ORNL90-0038, Development of Lithium Microbattery Packaging Technology ERKTS01, Oak Ridge National Laboratory, Martin Marietta, pp. 1-7.
Chryssikos, et al., "On the Structure of Alkali Borate Glasses Approaching the Orthoborate Composition," Materials Science and Engineering, B7, 1990, pp. 1-4, The Netherlands.
Tatsumisago, et al., "Mixed Anion Effect in Conductivity of Rapidly Quenched $Li_4SiO_4$-$Li_3BO_3$ Glasses," Yogyo-Kyokai-Shi, 95 [2], 1987, pp. 197-201.
Tatsumisago, et al., "Rapid Quenching Technique Using Thermal-Image Furnace for Glass Preparation," Communications of the American Ceramic Society, Jul. 1981, pp. C97-C98.
Miura, et al., "X-ray photoelectron spectroscopy of sodium borosilicate glasses," Journal of Non-Crystalline Solids, 290, 2001, pp. 1-14.
Muñoz, et al., "Composition and structure dependence of the properties of lithium borophosphate glasses showing boron anomaly," Journal of Non-Crystalline Solids, 355, 2009, pp. 2571-2577.
Umesaki, et al., Structure of rapidly quenched glasses in the system $Li_2O$—$SiO_2$, Journal of Materials Science, 28, 1993, 99. 3473-3481.
Kowada, et al., "Raman Spectra of Rapidly Quenched Glasses in the Systems $Li_3BO_3$—$Li_4SiO_4$—$Li_3PO_4$ and $Li_4B_2O_5$—$Li_6Si_2O_7$—$Li_4P_2O_7$," The Journal of Physical Chemisty, vol. 93, No. 5, 1989, pp. 2147-2151.
Umesaki, et al., "A Structural Study of Rapidly Quenched Glasses in the System $Li_2O$—$SiO_2$," Journal of Non-Crystalline Solids, 106, 1988, pp. 77-80, North-Holland, Amsterdam.
Tsuchiya, et al., Anomalous Behavior of Physical and Electrical Properties in Borophosphate Glasses Containing $R_2O$ and $V_2O_5$, Journal of Non-Crystalline Solids, 38 & 39, North-Holland Publishing Comganx, 1980, pp. 323-328.
Tatsumisago, et al., "Structure of rapidly quenched lithium phosphate glasses," Physics and Chemistry of Glasses, vol. 29, No. 2, Apr. 1988, pp. 63-66.
Tang et al.; "Comparative study of $LiMn_2O_4$ thin film cathode grown at high, medium and low temperatures by pulsed laser deposition", Journal of Solid State Chemistry, 2006, vol. 179 (12), pp. 3831-3838.
Thornton et al.; "Sputter Deposition Processes", Handbook of Deposition Technologies for Films and Coatings, 1994, second edition, pp. 249-272.
Wang et al.; "High power and capacity of $LiNi_{0.5}Mn_{1.5}O_4$ thin films cathodes prepared by pulsed laser deposition", Electrochimica Acta. 2013, vol. 102, pp. 416-422.
Singh et al.; "Challenges in making of thin films for $Li_xMn_yO_4$ rechargeable lithium batteries for MEMS", Journal of Power Sources, 2001, vol. 97-98, pp. 826-831.
Jayanth Babu, et al.; "Microstructural and electrochemical properties of rf-sputtered $LiMn_2O_4$ thin film cathodes", Appl. Nanosci. 2012, vol. 2, pp. 401-407.
Baggetto et al.; "Fabrication and characterization of Li—Mn—Ni—O sputtered thin film high voltage cathodes for Li-ion batteries", Journal of Power Sources, 2012, vol. 211, pp. 108-118.
Zhong et al.; "Synthesis and Electrochemistry of $LiNi_xMn_{2-x}O4$" Journal of Electrochemical Society, 1997, vol. 144(1), pp. 205-213.
Chen et al.; "High rate performance of $LiMn_2O_4$ cathodes for lithium ion batteries synthesized by low temperature oxygen plasma assisted sol-gel process", Thin Solid Films, 2013, vol. 544, pp. 182-185.

(56) References Cited

OTHER PUBLICATIONS

Park et al.; "Characterization of tin oxide/LiMn$_2$O$_4$ thin-film cell", Journal of Power Sources, 2000, vol. 88, pp. 250-254.

Wang et al.; "Synthesis, Crystal Structure, and Ionic Conductivity of a Polycrystalline Lithium Phosphorus Oxynitride with the y-Li3PO4 Structure", Journal of Solid State Chemistry, 1995, vol. 115(2), pp. 313-323, Abstract.

Beal et al.; "High Throughput Methodology for Synthesis, Screening, and Optimization of Solid State Lithium Ion Electrolytes", ACS Combinatorial Science, 2011, vol. 13 Issue 4, pp. 375-38.

Muralidharan, et al., "AC conductivity studies of lithium borosilicate glasses: synthesized by sol-gel process with various concentrations of nitric acid as a catalyst," Materials Chemistry and Physics 88 (2004) 138-144.

Muralidharan, et al., "Sol-gel synthesis, characterization and impedance studies of lithium borosilicate glass," Materials Research Bulletin 39(11), Sep. 2004, Abstract only, https://www.researchgate.net/publication/240386040_Sol-gel_synthesis_characterization_and_impedance_studies_of_lithium_borosilicate_glass.

Sahan et al., "Improvement of the electrochemical performance of LiMn2O4 cathode active material by lithium borosilicate (LBS) surface coating for lithium-ion batteries", Journal of Alloys and Compounds, Jan. 14, 2011, vol. 509, No. 11, pp. 4235-4241.

Machida et al.; "Preparation of amorphous films in the systems Li$_2$O$_2$ and Li$_2$O—B$_2$O$_{3-SiO2}$ by RF-sputtering and their ionic conductivity", Yogyo-Kyokat-shi, 1987, vol. 95(1), pp. 135-137.

Julien et al.; "Chapter 1. Design and Optimisation of Solid State Batteries", Solid State Batteries: Materials Design and Optimization, 1994, pp. 49-51.

Julien et al.; "Chapter 4, Materials for electrolyte: Thin Films", Solid State Batteries: Materials Design and Optimization, 1994, pp. 285-298.

Bates et al.; "Rechargeable Thin Film Lithium Batteries", Oak Ridge National Lab and Solid State Ionics, 1993.

Machida et al.; "Preparation of amorphous films in the systems Li$_2$O$_2$ and Li$_2$O—B$_2$O$_3$—SiO$_2$ by RF-sputtering and their ionic conductivity", Yogyo-Kyokai-shi, 1987, vol. 95(1), pp. 135-137.

Varshneya, A.K.; "Fundamentals of Inorganic Glasses", Academic Press, 1994, p. 33.

Hu et al.; "Influence of sputtering pressure on the structure and ionic conductivity of thin film amorphous electrolyte", Journal of Material Science, 2011, vol. 46, pp. 7588-7593.

Choi et al.; "Radio-Frequency Magnetron Sputtering Power Effect on the Ionic Conductivities of Upon Films", Electrochemical and Solid-State Letters, 2002, vol. 5(1), pp. A14-A17.

Zhao et al.; "A solid-state electrolyte lithium phosphorus oxynitride film prepared by pulsed laser deposition", Thin Solid Films, 2002, vol. 415, pp. 108-113.

Joo et al.; "Thin film lithium ion conducting LiBSO solid electrolyte", Solid State Ionics, 2003, vol. 160, pp. 51-59.

Office Action dated Jun. 2, 2021 in corresponding Chinese Application No. 201780037158.8.

Office Action dated Aug. 31, 2021 in corresponding Korean Application No. 10-2018-7038201.

* cited by examiner

LITHIUM BOROSILICATE GLASS AS ELECTROLYTE AND ELECTRODE PROTECTIVE LAYER

FIELD OF THE INVENTION

The invention relates to lithium borosilicate electrolytes and batteries comprising the same.

BACKGROUND OF THE INVENTION

The present invention relates to a lithium borosilicate glass composition which consists essentially of a system of lithium oxide in combination with silicon oxide and/or boron oxide, and preferably consists essentially of a ternary system of lithium oxide, silicon oxide and boron oxide. Ren et al. in Journal of the American Ceramic Society, 98 [12] (2015) 3603-3623 defines a series of characteristics which are required for an electrolyte if it is to be used in a solid state battery. The electrolyte should have high lithium ion conductivity at room temperature, negligible electronic conductivity (a lithium ion transference number close to unity), wide electrochemical window, and stability with respect to adjacent electrodes. Additionally, if lithium is used as the anode, then the electrolyte must be stable against lithium.

One example of a solid state electrolyte that displays some of these characteristics is lithium phosphorous oxynitride (LiPON). It exhibits high stability when in contact with lithium metal, it has a sufficiently wide electrochemical window and negligible electronic conductivity. This has allowed it to be successfully used in thin film solid state batteries.

A significant challenge in solid state battery development has been the identification of new solid electrolytes which may be used instead of LiPON. The identification of new electrolytes with the required characteristics is neither straightforward nor predictable. Additionally, a material which has the desired structure and ionic conductivities of a solid state electrolyte may not necessarily prove to be stable when operated in a solid state battery device.

This limits the design of new electrolyte materials for solid state batteries and leads to a trial and error approach to materials design. It has been suggested that further studies are needed in order to better understand the trends and mechanisms which exist in different classes of lithium ion conductors to facilitate the design of advanced lithium ion conductors. (Bachman et al, Chemical Reviews, 116 (2016) 140-162.

Lithium borosilicate compounds with the composition $Li_{0.78}B_{0.11}Si_{0.11}$ and $Li_{0.77}B_{0.18}Si_{0.05}$ and a nitrogen doped version of $Li_{0.78}B_{0.06}Si_{0.16}$ have been disclosed in WO2015/104540, Vapour Deposition Method for Preparing Amorphous Lithium Containing Compounds. The material was synthesized according to an embodiment of the current disclosure. The ionic conductivity was $3.2 \times 10^{-6}$ S/cm and the material was shown to be amorphous. A solid state battery comprising the lithium borosilicate electrolyte a lithium manganese oxide (LMO) cathode and a tin oxide ($SnO_2$) anode was produced. The disclosure does not provide any teachings regarding the electrochemical stability as a function of potential or electrochemical stability and reactivity when in contact with lithium or when operated in a solid state battery device with a lithium anode. As suggested by Bachman et al, it is not possible to predict the behavior of a particular composition of lithium borosilicate based upon its structure and ionic conductivity.

SUMMARY OF THE INVENTION

According to a first aspect of the invention, there is provided an electrode comprising an electrode active material; wherein a surface of said electrode is modified by a lithium borosilicate composition, wherein the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

According to a second aspect of the invention, there is provided a battery comprising a positive electrode, a negative electrode, and an electrolyte between said positive electrode and said negative electrode, wherein a surface of the positive electrode and/or the negative electrode is modified by a lithium borosilicate composition, wherein the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

According to a third aspect of the invention, there is provided a battery comprising a positive electrode, a negative electrode, and an electrolyte between said positive electrode and said negative electrode, wherein said negative electrode comprises lithium, wherein said electrolyte is a lithium borosilicate composition, wherein the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

According to a fourth aspect of the invention, there is provided a battery comprising a positive electrode, a negative electrode, and an electrolyte between said positive electrode and said negative electrode, wherein said electrolyte is a lithium borosilicate composition, wherein the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass, and wherein said battery has a fully charged capacity that is less than 0.5 µAh.

According to a fifth aspect of the invention, there is provided a battery comprising a positive electrode, a negative electrode, and an electrolyte between said positive electrode and said negative electrode, wherein said positive electrode comprises a positive electrode active material selected from the group consisting of $LiCoPO_4$, $LiNi_{0.5}Mn_{1.5}O_4$, $LiMnPO_4$, $LiCoO_2$, $LiNi_{1/3}Mn_{1/3}Co_{1/3}O_2$, $LiFePO_4$, $LiNiPO_4$, $Li_2NiPO_4F$, $Li_2CoPO_4F$, $LiMnPO_4F$, $Li_2CoSiO_4$, $Li_2MnSiO_4$, $FeF_3$, $LiMn_{0.8}Fe_{0.1}Ni_{0.1}PO_4$, $Li_{1-x}VOPO_4$, and $Li_2FePO_4F$, and wherein said electrolyte is a lithium borosilicate composition, wherein the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

According to a sixth aspect of the invention, there is provided a battery comprising: a positive electrode layer, a negative electrode layer, an electrolyte layer between said positive electrode layer and said negative electrode layer, and a layer of a lithium borosilicate composition between said positive electrode layer and said electrolyte layer and/or between said negative electrode layer and said electrolyte layer, wherein the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

According to a seventh aspect of the invention, there is provided a battery comprising: a composite positive electrode layer comprising particles of positive electrode active material, a negative electrode layer, an electrolyte layer between said positive electrode layer and said negative electrode layer, and a layer of a lithium borosilicate composition coating said particles of positive electrode active material and/or between said negative electrode layer and said electrolyte layer, wherein the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

According to an eighth aspect of the invention, there is provided a lithium borosilicate composition, consisting essentially of a system of lithium oxide in combination with silicon oxide and boron oxide, wherein said lithium borosilicate composition comprises between 81-83 atomic % lithium based on the combined atomic percentages of lithium, boron and silicon, and wherein said lithium borosilicate composition is a glass.

According to a ninth aspect of the invention, there is provided a method of making a lithium borosilicate composition according to the eighth aspect of the invention, wherein the lithium borosilicate composition is formed by a vacuum deposition process, the method comprising:
  providing separate vapour sources for each component element of the lithium borosilicate glass; wherein the vapour sources comprise a source of lithium, a source of oxygen, a source of boron and a source of silicon; and,
  co-depositing the component elements from their separate vapour sources onto a heated substrate wherein the component elements react on the substrate to form the lithium borosilicate composition.

According to a tenth aspect of the invention, there is provided a method of making the electrode according to the first aspect of the invention by a vacuum deposition process, the method comprising:
  a) providing first separate vapour sources for each component element of the electrode; and,
    co-depositing the component elements from their separate vapour sources onto a heated substrate wherein the component elements react on the heated substrate to form the electrode; and,
  b) providing second separate vapour sources for each component element of the lithium borosilicate composition, wherein the second vapour sources comprise a source of lithium, a source of oxygen, a source of boron and a source of silicon; and,
  c) co-depositing the component elements from the second separate vapour sources onto the electrode of a), wherein the component elements react on the electrode to form the lithium borosilicate composition.

According to an eleventh aspect of the invention, there is provided a method of making the battery according to any one of the third to fifth aspects of the invention, wherein the lithium borosilicate glass electrolyte is formed by a vacuum deposition process, the method comprising:
  providing first vapour sources comprising a separate vapour source of each component element of a compound intended for a first electrode layer, providing second vapour sources comprising a separate vapour source of each component element of a compound intended for a lithium borosilicate glass electrolyte layer, and providing third vapour sources comprising a separate vapour source of each component element of a compound intended for a second electrode layer;
  heating a substrate to a first temperature and co-depositing component elements from said first vapour sources onto the substrate, wherein the component elements react to form the first electrode layer;
  heating the substrate to a second temperature and co-depositing component elements from said second vapour sources onto the first electrode layer, wherein the component elements react to form a lithium borosilicate glass electrolyte layer; and
  heating the substrate to a third temperature and co-depositing component elements from third separate vapour sources onto the lithium borosilicate glass electrolyte layer, wherein the component elements react to form a second electrode layer.

According to a twelfth aspect of the invention, there is provided a method of making the battery according to the second aspect of the invention, wherein the lithium borosilicate surface-modified electrode is formed by a vapour deposition process, the method comprising:
  providing separate vapour sources for each component element of the lithium borosilicate glass wherein the vapour sources comprise a source of lithium, a source of oxygen, a source of boron and a source of silicon; and,
  co-depositing the component elements from their separate vapour sources onto a heated substrate wherein the component elements react on the substrate to form the lithium borosilicate composition.

According to a thirteenth aspect of the invention, there is provided the use of the lithium borosilicate composition as defined herein as an electrode protectant in a battery.

As used herein, the term "battery" is taken to be synonymous with the term "cell", and is a device capable of either generating electrical energy from chemical reactions or facilitating chemical reactions through the introduction of electrical energy.

Lithium Borosilicate Composition

Described herein is a lithium borosilicate composition, wherein said lithium borosilicate consists essentially of a system of lithium oxide in combination with silicon oxide and/or boron oxide, wherein said lithium borosilicate comprises between 70-83 atomic % lithium based on the combined atomic percentages of lithium, boron and silicon. Typically, said lithium borosilicate is a glass. Preferably, the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

Also, described herein is a lithium borosilicate glass defined as a system of lithium oxide in combination with silicon oxide and/or boron oxide, wherein the mol % of said lithium borosilicate glass is between 70.9 mol % $Li_2O$—0.0 mol % $B_2O_3$—29.1 mol % $SiO_2$; 53.8 mol % $Li_2O$—0.0 mol % $B_2O_3$—46.2 mol % $SiO_2$; 83.0 mol % $Li_2O$—17.0 mol % $B_2O_3$—0.0 mol % $SiO_2$; and 70.0 mol % $Li_2O$—30.0 mol % $B_2O_3$—0.0 mol % $SiO_2$. In a further embodiment, the lithium borosilicate glass is between 79.6 mol % $Li_2O$—12.2 mol % $B_2O_3$—8.2 mol % $SiO_2$; 60.3 mol % $Li_2O$—12.1 mol % $B_2O_3$—27.6 mol % $SiO_2$; 73.8 mol % $Li_2O$—3.8 mol % $B_2O_3$—22.4 mol % $SiO_2$; and 62.2 mol % $Li_2O$—15.6 mol % $B_2O_3$ 22.2 mol % $SiO_2$. In another embodiment, the lithium borosilicate glass is between 70.9 mol % $Li_2O$—0.0 mol % $B_2O_3$—29.1 mol % $SiO_2$; 66.7 mol % $Li_2O$—0.0 mol % $B_2O_3$—33.3 mol % $SiO_2$; 83.0 mol % $Li_2O$—17.0 mol % $B_2O_3$—0.0 mol % $SiO_2$; and 75.0 mol % $Li_2O$—25.0 mol % $B_2O_3$ 0.0 mol % $SiO_2$.

In one aspect, the invention relates to a lithium borosilicate composition, wherein said lithium borosilicate consists essentially of a system of lithium oxide, silicon oxide and boron oxide, wherein said lithium borosilicate comprises between 70-83 atomic % lithium based on the combined atomic percentages of lithium, boron and silicon. Typically, said lithium borosilicate is a glass. In one embodiment, the invention relates to a lithium borosilicate composition, wherein said lithium borosilicate consists essentially of a system of lithium oxide, silicon oxide and boron oxide, wherein said lithium borosilicate comprises between 81-83 atomic % lithium based on the combined atomic percentages of lithium, boron and silicon.

In one aspect, the invention relates to a lithium borosilicate composition, wherein said lithium borosilicate consists essentially of a ternary system of lithium oxide, silicon oxide and boron oxide, wherein said lithium borosilicate comprises between 70-83 atomic % lithium based on the combined atomic percentages of lithium, boron and silicon. Typically, said lithium borosilicate is a glass. In one embodiment, the invention relates to a lithium borosilicate composition, wherein said lithium borosilicate consists essentially of a ternary system of lithium oxide, silicon oxide and boron oxide, wherein said lithium borosilicate comprises between 81-83 atomic % lithium based on the combined atomic percentages of lithium, boron and silicon.

It will be appreciated that small amounts of other atoms may be present in the lithium borosilicate material according to the invention; provided that such amounts of other atoms do not affect the properties of the lithium borosilicate material. Such traces of other atoms may substitute for any of Li, B, O and/or Si, preferably for B and/or Si.

Typical examples of atoms which may substitute for Li, B, O and/or Si (preferably for B and/or Si) in the structure of the lithium borosilicate material include N, S, Ge, Al, P, Ti, V, Zr, Pb, Ga, As, Sn, In, Sb, Bi, Nb, Ta and W. Preferred examples of atoms which may substitute for Li, B, O and/or Si (preferably for B and/or Si) in the structure of the lithium borosilicate material include Al, Ti, Ge, P, V, W, S and N.

In this regard, the term "consisting essentially of a system of lithium oxide in combination with silicon oxide and/or boron oxide" means that the total amount of lithium, boron and silicon atoms in the lithium borosilicate material, expressed as a molar percentage of the total amount of atoms other than oxygen in the material, is at least 90%, preferably at least 95%, preferably at least 97%, more preferably at least 98%, even more preferably at least 99%, still more preferably at least 99.5%, even more preferably at least 99.7%, still more preferably at least 99.8%, even more preferably at least 99.9%, still more preferably at least 99.95%, even more preferably at least 99.97%, still more preferably at least 99.98%, even more preferably at least 99.99%, still more preferably at least 99.995%, even more preferably at least 99.997%, still more preferably at least 99.998%, even more preferably at least 99.999%, still more preferably at least 99.9995%, even more preferably at least 99.9997%, still more preferably at least 99.9998%, even more preferably at least 99.9999%, and most preferably 100%.

In one embodiment, the invention relates to a lithium borosilicate composition, wherein said lithium borosilicate consists of a ternary system of lithium oxide, silicon oxide and boron oxide, wherein said lithium borosilicate comprises between 81-83 atomic % lithium based on the combined atomic percentages of lithium, boron and silicon. Typically, said lithium borosilicate is a glass.

It has been surprisingly found by the present inventors that the lithium borosilicate glass as described herein exhibits high ionic conductivity while also exhibiting lower electronic conductivity. It has also been surprisingly found that the lithium borosilicate glass as described herein is particularly stable in contact with lithium, particularly at high voltages. These surprisingly improved properties make the lithium borosilicate glass composition particularly suitable as a protectant for electrodes, particularly on the anode of a battery including the composition as a coating on the anode. This could not have been predicted from the art.

It has further been surprisingly found by the present inventors that the lithium borosilicate glass as described herein is chemically/electrochemically stable in contact with lithium. These surprisingly improved properties make the lithium borosilicate glass composition particularly suitable as an electrolyte in contact with lithium metal. This could not have been predicted from the art.

It has further been surprisingly found by the present inventors that the lithium borosilicate glass as described herein has electrochemical stability when subjected to a broad range of electrical potentials. In particular, the lithium borosilicate electrolyte is capable of operation at high voltages. This could not have been predicted from the art.

In one embodiment, the invention provides the lithium borosilicate glass is in contact with a positive cathode active material with a potential of 3.6-8.5 V vs. Li/Li$^+$, wherein said lithium borosilicate glass is electrochemically stable. In a further embodiment, the lithium borosilicate glass is in contact with a positive cathode active material with a potential of 5-8.5 V vs. Li/Li$^+$, wherein said lithium borosilicate glass is electrochemically stable. In a further embodiment, the lithium borosilicate glass is in contact with a positive cathode active material with a potential greater than 5.5 V vs. Li/Li$^+$, wherein said lithium borosilicate glass is electrochemically stable.

In another embodiment, the lithium borosilicate glass is configured between platinum and platinum electrodes with a potential between 0 and 10 V, wherein said lithium borosilicate glass is electrochemically stable.

In a further embodiment, the lithium borosilicate glass is configured between platinum and nickel electrodes with a potential between 0 and 5 V, wherein said lithium borosilicate glass is electrochemically stable.

In another embodiment, the lithium borosilicate glass has an ionic conductivity that is at least $1.0 \times 10^{-6}$ S/cm at 25° C.

In another embodiment, the invention relates to a lithium borosilicate electrolyte that has low electronic conductivity. In a further embodiment, the lithium borosilicate glass has an electronic conductivity that is less than $2.0 \times 10^{-13}$ S/cm at 25° C. In a further embodiment, the lithium borosilicate glass has an electronic conductivity that is less than $8.5 \times 10^{-14}$ S/cm at 25° C.

In another embodiment, the lithium borosilicate glass is a thin film. In a further embodiment, the thin film is between 40 nm to 15 micrometers thick.

Electrode Surface-Modified with a Lithium Borosilicate Composition

A first aspect of the invention provides an electrode comprising an electrode active material; wherein a surface of said electrode is modified by a lithium borosilicate composition, wherein the lithium borosilicate composition consists essentially of a system of lithium oxide in combination with silicon oxide and/or boron oxide, wherein said lithium borosilicate comprises between 70-83 atomic % lithium based on the combined atomic percentages of lithium, boron and silicon, and wherein said lithium borosilicate is a glass. Preferably, the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass. The LiBSiO-surface-modified electrode has improved stability and/or improved cycling over unmodified electrode, particularly although not exclusively when operated in the presence of an adjacent liquid phase electrolyte material. In one embodiment, the LiBSiO-surface-modified electrode is a LiBSiO-surface-modified negative electrode. In another embodiment, the LiBSiO-surface-modified electrode is a LiBSiO-surface-modified positive electrode.

Battery Comprising a Lithium Borosilicate Surface-Modified Electrode

A second aspect of the invention relates to a battery comprising a positive electrode, a negative electrode, and an electrolyte between said positive electrode and said negative electrode, wherein a surface of the positive electrode and/or negative electrode is modified by a LiBSiO composition of the present invention.

In one embodiment, the invention relates to a battery comprising a positive electrode, a negative electrode, and an electrolyte between said positive electrode and said negative electrode, wherein the positive electrode and/or negative electrode is coated with a layer of a LiBSiO composition of the present invention.

In one embodiment, the battery comprises a LiBSiO-surface-modified negative electrode. In another embodiment, the battery comprises a LiBSiO-surface-modified positive electrode.

Batteries comprising a LiBSiO-surface-modified electrode according to the present invention, particularly but not exclusively the negative electrode, have been found to be particularly advantageous in accordance with the present invention. Without wishing to be bound by theory, it is believed that the properties of the LiBSiO composition as described herein allow the composition to function as a particularly effective electrode protection layer on the electrode of such a battery, particularly a lithium ion battery and especially a lithium ion battery with a liquid or polymer electrolyte.

In one embodiment, this aspect of the invention relates to a battery comprising a positive current collector, a positive electrode, an electrolyte, a negative electrode, and a negative current collector, wherein a surface of the positive electrode and/or negative electrode is modified by a LiBSiO composition of the present invention. In one embodiment, the battery comprises a LiBSiO-surface-modified negative electrode. In another embodiment, the battery comprises a LiBSiO-surface-modified positive electrode. In a further embodiment, the battery is a lithium ion secondary battery. In another embodiment, the lithium ion secondary battery is a thin-film battery.

Battery Comprising a Lithium Borosilicate Electrolyte and a Negative Electrode Comprising Lithium A third aspect of the invention relates to a battery comprising a positive electrode, a negative electrode, wherein said negative electrode comprises lithium, and an electrolyte between said positive electrode and said negative electrode, wherein said electrolyte is a lithium borosilicate composition, wherein the lithium borosilicate composition consists essentially of a system of lithium oxide in combination with silicon oxide and/or boron oxide, wherein said lithium borosilicate comprises between 70-83 atomic % lithium based on the combined atomic percentages of lithium, boron and silicon, and wherein said lithium borosilicate is a glass. Preferably, the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

In one embodiment, the battery is a lithium ion secondary battery. Herein, lithium ion secondary battery is defined as a device that converts chemical energy contained in its active materials directly into electrical energy via the reversible removal and insertion of lithium ions from the negative and positive electrodes accompanied by their transport across the electrolyte whilst the associated electrons pass through the external circuit. The said negative electrode can be realized as an integral component of the battery structure prior to electrochemical cycling, or during the first charging of the battery as lithium is plated onto the surface of the negative current collector comprising the interface with the electrolyte. In another embodiment, the positive electrode of the battery comprises a positive electrode active material selected from the group $LiCoPO_4$, $LiNi_{0.5}Mn_{1.5}O_4$, $LiMnPO_4$, $LiMn_2O_4$, $LiCoO_2$, $LiNi_{1/3}Mn_{1/3}Co_{1/3}O_2$, $LiFePO_4$, $LiNiPO_4$, $Li_2NiPO_4F$, $Li_2CoPO_4F$, $LiMnPO_4F$, $Li_2CoSiO_4$, $Li_2MnSiO_4$, $FeF_3$, $LiMn_{0.8}Fe_{0.1}Ni_{0.1}PO_4$, $LiVOPO_4$, $Li_2FePO_4F$.

In another embodiment, the battery further comprises a negative electrode current collector and a positive electrode current collector. In another embodiment, the negative electrode current collector comprises a negative electrode current collector material selected from the group consisting of Pt, Ni, Mo, Cu, TiN, Al, Au and stainless steel. In another embodiment, the positive electrode current collector material selected from the group consisting of Pt, Ni, Mo, Al, Au, stainless steel, indium doped tin oxide (ITO) and other electrically conducting metal oxides.

In another embodiment, the battery is a solid state battery. In a further embodiment, the solid state battery comprises: a substrate layer; a positive current collector layer; a positive electrode layer; a negative electrode layer; a negative current collector layer; and a lithium borosilicate glass electrolyte layer between said positive electrode layer and said negative electrode layer.

In another embodiment, the battery further comprises a passivation layer (e.g., $Si_3N_4$) and/adhesion layer (e.g., $TiO_2$) between the substrate and current collector.

In another embodiment, the battery comprises an encapsulation layer. In a further embodiment, the encapsulation layer comprises AlN, $Si_3N_4$, $SiO_2$, $Al_2O_3$, Al, Cu, a poly (p-xylylene) polymer (Parylene™), polyimide, or the copolymer poly(ethylene-co-methacrylic acid) (SURLYN®).

In another embodiment, the battery comprises a substrate material selected from the group consisting of AlOPt (Sapphire/$TiO_2$/Pt), SSTOP (Si/$SiO_2$/$TiO_2$/Pt), Si, $SiO_2$, $Si_3N_4$, mica, and float glass.

In another embodiment, the battery is a thin film battery. In a further embodiment, the positive electrode is between 1 and 10 microns thick, preferably 2-8 microns thick. In a further embodiment, the negative electrode is between 50 nm and 5 microns thick, preferably 0.15-3 microns thick. In a further embodiment, the lithium borosilicate glass electrolyte layer is between 40 nm to 15 microns thick, preferably 0.4-5 microns thick.

In another embodiment, the battery has an open circuit voltage in the charged state of between 1.0-8.5 V. In a further embodiment, the battery has an open circuit voltage in the charged state of between 3.6-8.5 V. In a further embodiment, the battery has an open circuit voltage in the charged state of between 5.5-8.5 V.

In another embodiment, the invention relates to a battery comprising a lithium borosilicate electrolyte that has high ionic conductivity. In a further embodiment, the lithium borosilicate glass electrolyte has an ionic conductivity of at least $1.0 \times 10^{-6}$ S/cm at 25° C.

In another embodiment, the invention relates to a battery comprising a lithium borosilicate electrolyte that has low electronic conductivity. In a further embodiment, the lithium borosilicate glass electrolyte has an electronic conductivity that is less than $2.0 \times 10^{13}$ S/cm at 25° C.

In another embodiment, the invention relates to a battery comprising a lithium borosilicate electrolyte that has high ionic conductivity and low electronic conductivity. In a further embodiment, the lithium borosilicate glass electrolyte has an ionic conductivity of at least $1.0 \times 10^{-6}$ S/cm and an electronic conductivity that is less than $2.0 \times 10^{-13}$ S/cm at 25° C.

In another embodiment, the invention relates to a battery comprising a lithium borosilicate electrolyte that is electrochemically stable against lithium. In a further embodiment, the invention relates to a battery comprising a lithium borosilicate electrolyte and a lithium anode. In a further embodiment, the invention relates to a lithium-free battery comprising a lithium borosilicate electrolyte.

In another embodiment, the invention relates to a battery comprising a lithium borosilicate electrolyte that is capable of operation at high voltages. In another embodiment, the lithium borosilicate glass electrolyte is electrochemically stable at all potentials between 0 and 10 V. In another embodiment, the lithium borosilicate glass electrolyte is electrochemically stable at all potentials from 0 and 8 V.

In another embodiment, the lithium borosilicate glass electrolyte is electrochemically stable at all potentials between 3.6 and 8.5 V vs. Li/$Li^+$.

In another embodiment, the battery has a fully charged capacity that is between 0.04-5.011 Ah. In a further embodiment, the battery has a fully charged capacity that is less than 0.5 µAh. In a further embodiment, the battery has a fully charged capacity that is less than 0.1 µAh. In another embodiment, the battery has a fully charged capacity that is between 2.0 µAh/$cm^2$ and 300 µAh/$cm^2$. In a further embodiment, the fully charged capacity that is between 2 µAh/$cm^2$ and 200 µAh/$cm^2$. In a further embodiment, the fully charged capacity that is between 2 µAh/$cm^2$ and 100 µAh/$cm^2$. In a further embodiment, the fully charged capacity that is between 2 µAh/$cm^2$ and 50 µAh/$cm^2$. In a further embodiment, the fully charged capacity that is between 100 µAh/$cm^2$ and 300 µAh/$cm^2$. In another embodiment, the battery has a fully charged capacity that is between 3.25 µAh/$cm^2$ and 650 µAh/$cm^2$ and the LiBSiO thickness is between 21 µm and 2.7 nm. In another embodiment, the battery has a fully charged capacity that is between 3.25 µAh/$cm^2$ and 32.5 µAh/$cm^2$ and the LiBSiO thickness is between 21 µm and 55 nm. In another embodiment, the battery has a fully charged capacity that is between 32.5 µAh/$cm^2$ and 65 µAh/$cm^2$ and the LiBSiO thickness is between 11 µm and 27 nm. In another embodiment, the battery has a fully charged capacity that is between 65 µAh/$cm^2$ and 650 µAh/$cm^2$ and the LiBSiO thickness is between 1.3 µm and 2.7 nm.

Another embodiment provides for a battery stack comprising at least two batteries of the present invention.

Battery having a fully charged capacity that is less than 0.5 µAh, said battery comprising a lithium borosilicate electrolyte A fourth aspect of the invention relates to a battery comprising a positive electrode, a negative electrode, and an electrolyte between said positive electrode and said negative electrode, wherein said electrolyte is a lithium borosilicate composition, wherein the lithium borosilicate composition consists essentially of a system of lithium oxide in combination with silicon oxide and/or boron oxide, wherein said lithium borosilicate comprises between 70-83 atomic % lithium based on the combined atomic percentages of lithium, boron and silicon, and wherein said lithium borosilicate is a glass, and wherein said battery has a fully charged capacity that is less than 0.5 µAh. Preferably, the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

In one embodiment, the battery is a lithium ion secondary battery. Herein, lithium ion secondary battery is defined as a device that converts chemical energy contained in its active materials directly into electrical energy via the reversible removal and insertion of lithium ions from the negative and positive electrodes accompanied by their transport across the electrolyte whilst the associated electrons pass through the external circuit. The said negative electrode can be realized as an integral component of the battery structure prior to electrochemical cycling, or during the first charging of the battery as lithium is plated onto the surface of the negative current collector comprising the interface with the electrolyte. In another embodiment, the positive electrode of the battery comprises a positive electrode active material selected from the group $LiCoPO_4$, $LiNi_{0.5}Mn_{1.5}O_4$, $LiMnPO_4$, $LiMn_2O_4$, $LiCoO_2$, $LiNi_{1/3}Mn_{1/3}Co_{1/3}O_2$, $LiFePO_4$, $LiNiPO_4$, $Li_2NiPO_4F$, $Li_2CoPO_4F$, $LiMnPO_4F$, $Li_2CoSiO_4$, $Li_2MnSiO_4$, $FeF_3$, $LiMn_{0.8}Fe_{cu}Ni_{0.1}PO_4$, $LiVOPO_4$, $Li_2FePO_4F$. In another embodiment, the negative electrode of the battery comprises a negative electrode active material selected from the group lithium, silicon, tin, magnesium, aluminum, antimony, indium, titanium, nickel, cobalt, chromium, germanium, zinc, oxygen, carbon, vanadium, niobium, bismuth, tungsten, sulfur, and iron.

In a further embodiment, the positive electrode comprises a positive electrode active material selected from the group consisting of $LiCoPO_4$, $LiNi_{0.5}Mn_{1.5}O_4$, $LiMnPO_4$, $LiMn_2O_4$, $LiCoO_2$, $LiNi_{1/3}Mn_{1/3}Co_{1/3}O_2$, $LiFePO_4$, $LiNiPO_4$, $Li_2NiPO_4F$, $Li_2CoPO_4F$, $LiMnPO_4F$, $Li_2CoSiO_4$, $Li_2MnSiO_4$, $FeF_3$, $LiMn_{0.8}Fe_uNi_{0.1}PO_4$, $LiVOPO_4$, $Li_2FePO_4F$ and the negative electrode comprises a negative electrode active material selected from the group consisting of lithium, silicon, tin, magnesium, aluminum.

In another embodiment, the battery further comprises a negative electrode current collector and a positive electrode current collector. In another embodiment, the negative electrode current collector comprises a negative electrode current collector material selected from the group consisting of Pt, Ni, Mo, Cu, TiN, Al, Au and stainless steel. In another embodiment, the positive electrode current collector material selected from the group consisting of Pt, Ni, Mo, Al, Au, stainless steel, indium doped tin oxide (ITO) and other electrically conducting metal oxides.

In another embodiment, the battery is a solid state battery. In a further embodiment, the solid state battery comprises: a substrate layer; a positive current collector layer; a positive electrode layer; a negative electrode layer; a negative current collector layer; and a lithium borosilicate glass electrolyte layer between said positive electrode layer and said negative electrode layer.

In another embodiment, the battery further comprises a passivation layer (e.g., $Si_3N_4$) and/adhesion layer (e.g., $TiO_2$) between a substrate and the current collector.

In another embodiment, the battery comprises an encapsulation layer. In a further embodiment, the encapsulation layer comprises AlN, $Si_3N_4$, $SiO_2$, $Al_2O_3$, Al, Cu, a poly (p-xylylene polymer (Parylene™), polyimide, or poly(ethylene-co-methacrylic acid) (SURLYN®).

In another embodiment, the battery comprises a substrate material selected from the group consisting of AlOPt (Sapphire/$TiO_2$/Pt), SSTOP (Si/$SiO_2$/$TiO_2$/Pt), Si, $SiO_2$, $Si_3N_4$, mica, and float glass.

In another embodiment, the battery is a thin film battery. In a further embodiment, the positive electrode is between 1 and 10 μm thick, preferably 2-8 μm thick. In a further embodiment, the negative electrode is between 50 nm and 5 μm thick, preferably 0.15-3 μm thick. In a further embodiment, the lithium borosilicate glass electrolyte layer is between 40 nm to 15 μm thick, preferably 0.4-5 μm thick.

In another embodiment, the battery has an open circuit voltage in the charged state of between 1.0-8.5 V. In a further embodiment, the battery has an open circuit voltage in the charged state of between 3.6-8.5 V. In a further embodiment, the battery has an open circuit voltage in the charged state of between 4.6-8.5 V. In a further embodiment, the battery has an open circuit voltage in the charged state of between 5.5-8.5 V.

In another embodiment, the invention relates to a battery comprising a lithium borosilicate electrolyte that has high ionic conductivity. In a further embodiment, the lithium borosilicate glass electrolyte has an ionic conductivity of at least $1.0 \times 10^{-6}$ S/cm at 25° C.

In another embodiment, the invention relates to a battery comprising a lithium borosilicate electrolyte that has low electronic conductivity. In a further embodiment, the lithium borosilicate glass electrolyte has an electronic conductivity that is less than $2.0 \times 10^{-13}$ S/cm at 25° C.

In another embodiment, the invention relates to a battery comprising a lithium borosilicate electrolyte that has high ionic conductivity and low electronic conductivity. In a further embodiment, the lithium borosilicate glass electrolyte has an ionic conductivity of at least $1.0 \times 10^{-6}$ S/cm and an electronic conductivity that is less than $2.0 \times 10^{-13}$ S/cm at 25° C.

In another embodiment, the invention relates to a battery comprising a lithium borosilicate electrolyte that is electrochemically stable against lithium. In a further embodiment, the invention relates to a battery comprising a lithium borosilicate electrolyte and a lithium anode. In a further embodiment, the invention relates to a lithium-free battery comprising a lithium borosilicate electrolyte.

In another embodiment, the invention relates to a battery comprising a lithium borosilicate electrolyte that is capable of operation at high voltages. In another embodiment, the lithium borosilicate glass electrolyte is electrochemically stable at all potentials between 0 and 10 V. In another embodiment, the lithium borosilicate glass electrolyte is electrochemically stable at all potentials from 0 and 8 V.

In another embodiment, the lithium borosilicate glass electrolyte is electrochemically stable at all potentials between 3.6 and 8.5 V vs. Li/Li$^+$.

In another embodiment, the battery has a fully charged capacity that is less than 0.1 μAh. In another embodiment, the battery has a fully charged capacity that is between 2.0 μAh/cm$^2$ and 300 μAh/cm$^2$. In a further embodiment, the fully charged capacity is between 2 μAh/cm$^2$ and 200 μAh/cm$^2$. In a further embodiment, the fully charged capacity is between 2 μAh/cm$^2$ and 100 μAh/cm$^2$. In a further embodiment, the fully charged capacity is between 2 μAh/cm$^2$ and 50 μAh/cm$^2$, In a further embodiment, the fully charged capacity is between 100 μAh/cm$^2$ and 300 μAh/cm$^2$.

Another embodiment provides for a battery stack comprising at least two batteries of the present invention.

Battery Comprising a Lithium Borosilicate Electrolyte and a High-Voltage Positive Electrode A fifth aspect relates to a battery comprising a positive electrode, a negative electrode, and an electrolyte between said positive electrode and said negative electrode, wherein said positive electrode comprises a positive electrode active material selected from the group consisting of LiCoPO$_4$, LiNi$_{0.5}$Mn$_{1.5}$O$_4$, LiMnPO$_4$, LiCoO$_2$, LiNi$_{1/3}$Mn$_{1/3}$CO$_{1/3}$O$_2$, LiFePO$_4$, LiNiPO$_4$, Li$_2$NiPO$_4$F, Li$_2$CoPO$_4$F, LiMnPO$_4$F, Li$_2$CoSiO$_4$, Li$_2$MnSiO$_4$, FeF$_3$, Li$_{1-x}$VOPO$_4$, and Li$_2$FePO$_4$F, and wherein said electrolyte is a lithium borosilicate composition, wherein the lithium borosilicate composition consists essentially of a system of lithium oxide in combination with silicon oxide and/or boron oxide, wherein said lithium borosilicate comprises between 70-83 atomic % lithium based on the combined atomic percentages of lithium, boron and silicon, and wherein said lithium borosilicate is a glass. Preferably, the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

In one embodiment, the battery is a lithium ion secondary battery. Herein, lithium ion secondary battery is defined as a device that converts chemical energy contained in its active materials directly into electrical energy via the reversible removal and insertion of lithium ions from the negative and positive electrodes accompanied by their transport across the electrolyte whilst the associated electrons pass through the external circuit. The said negative electrode can be realized as an integral component of the battery structure prior to electrochemical cycling, or during the first charging of the battery as lithium is plated onto the surface of the negative current collector comprising the interface with the electrolyte. In another embodiment, the negative electrode of the battery comprises a negative electrode active material selected from the group lithium, silicon, tin, magnesium, aluminum, antimony, indium, titanium, nickel, cobalt, chromium, germanium, zinc, oxygen, carbon, vanadium, niobium, bismuth, tungsten, sulfur, and iron.

In a further embodiment, the positive electrode comprises a positive electrode active material selected from the group consisting of $LiCoPO_4$, $LiNi_{0.5}Mn_{1.5}O_4$, $LiMnPO_4$, $LiCoO_2$, $LiNi_{1/3}Mn_{1/3}CO_{1/3}O_2$, $LiFePO_4$, $LiNiPO_4$, $Li_2NiPO_4F$, $Li_2CoPO_4F$, $LiMnPO_4F$, $Li_2CoSiO_4$, $Li_2MnSiO_4$, $FeF_3$, $LiMn_{0.8}Fe_{0.1}Ni_{0.1}PO_4$, $LiVOPO_4$, $Li_2FePO_4F$ and the negative electrode comprises a negative electrode active material selected from the group consisting of lithium, silicon, tin, magnesium, aluminum.

In another embodiment, the battery further comprises a negative electrode current collector and a positive electrode current collector. In another embodiment, the negative electrode current collector comprises a negative electrode current collector material selected from the group consisting of Pt, Ni, Mo, Cu, TiN, Al, Au and stainless steel. In another embodiment, the positive electrode current collector material selected from the group consisting of Pt, Ni, Mo, Al, Au, stainless steel, indium doped tin oxide (ITO) and other electrically conducting metal oxides.

In another embodiment, the battery is a solid state battery. In a further embodiment, the solid state battery comprises: a substrate layer; a positive current collector layer; a positive electrode layer; a negative electrode layer; a negative current collector layer; and a lithium borosilicate glass electrolyte layer between said positive electrode layer and said negative electrode layer.

In another embodiment, the battery further comprises a passivation layer (e.g., $Si_3N_4$) and/adhesion layer (e.g., $TiO_2$) between the substrate and current collector.

In another embodiment, the battery comprises an encapsulation layer. In a further embodiment, the encapsulation layer comprises AlN, $Si_3N_4$, $SiO_2$, $Al_2O_3$, Al, Cu, a poly (p-xylylene polymer (Parylene™), polyimide, or polyethylene-co-methacrylic acid) (SURLYN®).

In another embodiment, the battery comprises a substrate material selected from the group consisting of AlOPt (Sapphire/$TiO_2$/Pt), SSTOP (Si/$SiO_2$/$TiO_2$/Pt), Si, $SiO_2$, $Si_3N_4$, mica, and float glass.

In another embodiment, the battery is a thin film battery. In a further embodiment, the positive electrode is between 1 and 10 microns thick, preferably 2-8 microns thick. In a further embodiment, the negative electrode is between 50 nm and 5 microns thick, preferably 0.15-3 microns thick. In a further embodiment, the lithium borosilicate glass electrolyte layer is between 40 nm to 15 microns thick, preferably 0.4-5 microns thick.

In another embodiment, the battery has an open circuit voltage in the charged state of between 1.0-8.5 V. In a further embodiment, the battery has an open circuit voltage in the charged state of between 3.6-8.5 V. In a further embodiment, the battery has an open circuit voltage in the charged state of between 4.6-8.5 V. In a further embodiment, the battery has an open circuit voltage in the charged state of between 5.5-8.5 V.

In another embodiment, the invention relates to a battery comprising a lithium borosilicate electrolyte that has high ionic conductivity. In a further embodiment, the lithium borosilicate glass electrolyte has an ionic conductivity of at least $1.0 \times 10^{-6}$ S/cm at 25° C.

In another embodiment, the invention relates to a battery comprising a lithium borosilicate electrolyte that has low electronic conductivity. In a further embodiment, the lithium borosilicate glass electrolyte has an electronic conductivity that is less than $2.0 \times 10^{-13}$ S/cm at 25° C.

In another embodiment, the invention relates to a battery comprising a lithium borosilicate electrolyte that has high ionic conductivity and low electronic conductivity. In a further embodiment, the lithium borosilicate glass electrolyte has an ionic conductivity of at least $1.0 \times 10^{-6}$ S/cm and an electronic conductivity that is less than $2.0 \times 10^{-13}$ S/cm at 25° C.

In another embodiment, the invention relates to a battery comprising a lithium borosilicate electrolyte that is electrochemically stable against lithium. In a further embodiment, the invention relates to a battery comprising a lithium borosilicate electrolyte and a lithium anode. In a further embodiment, the invention relates to a lithium-free battery comprising a lithium borosilicate electrolyte.

In another embodiment, the invention relates to a battery comprising a lithium borosilicate electrolyte that is capable of operation at high voltages. In another embodiment, the lithium borosilicate glass electrolyte is electrochemically stable at all potentials between 0 and 10 V. In another embodiment, the lithium borosilicate glass electrolyte is electrochemically stable at all potentials from 0 to 8 V.

In another embodiment, the lithium borosilicate glass electrolyte is electrochemically stable at all potentials between 3.6 and 8.5 V vs. Li/Li$^+$.

In another embodiment, the battery has a fully charged capacity that is between 0.04-5.0 μAh. In a further embodiment, the battery has a fully charged capacity that is less than 0.5 μAh. In a further embodiment, the battery has a fully charged capacity that is less than 0.1 μAh. In another embodiment, the battery has a fully charged capacity that is between 2.0 μAh/cm$^2$ and 300 μAh/cm$^2$. In a further embodiment, the fully charged capacity is between 2 μAh/cm$^2$ and 200 μAh/cm$^2$. In a further embodiment, the fully charged capacity is between 2 μAh/cm$^2$ and 100 μAh/cm$^2$. In a further embodiment, the fully charged capacity is between 2 μAh/cm$^2$ and 50 μAh/cm$^2$. In a further embodiment, the fully charged capacity is between 100 μAh/cm$^2$ and 300 μAh/cm$^2$.

Another embodiment provides for a battery stack comprising at least two batteries of the present invention.

Method of Making Lithium Borosilicate Composition

A ninth aspect provides for a method of making the lithium borosilicate composition as defined herein. In one embodiment, the lithium borosilicate composition is formed by a vacuum deposition process. In a further embodiment, the lithium borosilicate composition is formed by a physical vapor deposition process.

In one embodiment, the invention relates to a method of making a lithium borosilicate electrolyte that is electrochemically stable against lithium. In a further embodiment, the battery comprises a lithium anode.

In another embodiment, the invention relates to a method of making a lithium borosilicate electrolyte that is capable of operation at high voltages. In a further aspect, the battery is suitable for longer term cycling.

In another embodiment, the invention relates to a method of making a lithium borosilicate electrolyte that has low electronic conductivity. In a further embodiment, the battery has a low capacity.

Method of Making a Lithium Borosilicate Surface-Modified Electrode

A tenth aspect provides for a method of making a LiBSiO-surface-modified electrode. The method of making the LiBSiO-surface-modified electrode of the invention is not particularly limited as long as the method is able to provide a desired LiBSiO-surface-modified electrode that improves stability or improves cycling of the electrode. Examples of the method include PVD as described herein. In one embodiment, the method is a method of making a LiBSiO-surface-modified negative electrode. In another embodiment, the method is a method of making a LiBSiO-surface-modified positive electrode. In one embodiment, the LiBSiO coating is produced by physical vapour deposition (PVD).

Method of Making a Battery Comprising a Lithium Borosilicate Electrolyte

An eleventh aspect of the invention relates to a method of making a battery comprising a lithium borosilicate electrolyte.

In one embodiment, the invention relates to a method of making a battery comprising a lithium borosilicate electrolyte that is electrochemically stable against lithium. In a further embodiment, the battery comprises a lithium anode.

In another embodiment, the invention relates to a method of making a battery comprising a lithium borosilicate electrolyte that is capable of operation at high voltages. In a further aspect, the battery is suitable for longer term cycling.

In another embodiment, the invention relates to a method of making a battery comprising a lithium borosilicate electrolyte that has low electronic conductivity. In a further embodiment, the battery has a low capacity.

Method of Making a Battery Comprising a Lithium Borosilicate Surface-Modified Electrode A further aspect provides for a method of making a battery comprising an electrode a surface of which is modified by a LiBSiO material of the present invention. In one embodiment, the method is a method of making a battery comprising a LiBSiO-surface-modified negative electrode. In another embodiment, the method is a method of making a battery comprising a LiBSiO-surface-modified positive electrode. In a further embodiment, the battery is a lithium ion secondary battery. In another embodiment, the lithium ion secondary battery is a thin-film battery.

BRIEF DESCRIPTION OF THE DRAWINGS

FIG. 4A shows data points over the entire experimental range. FIG. 4B shows data points below 40 kΩ.

DETAILED DESCRIPTION OF THE INVENTION

Figure 1:
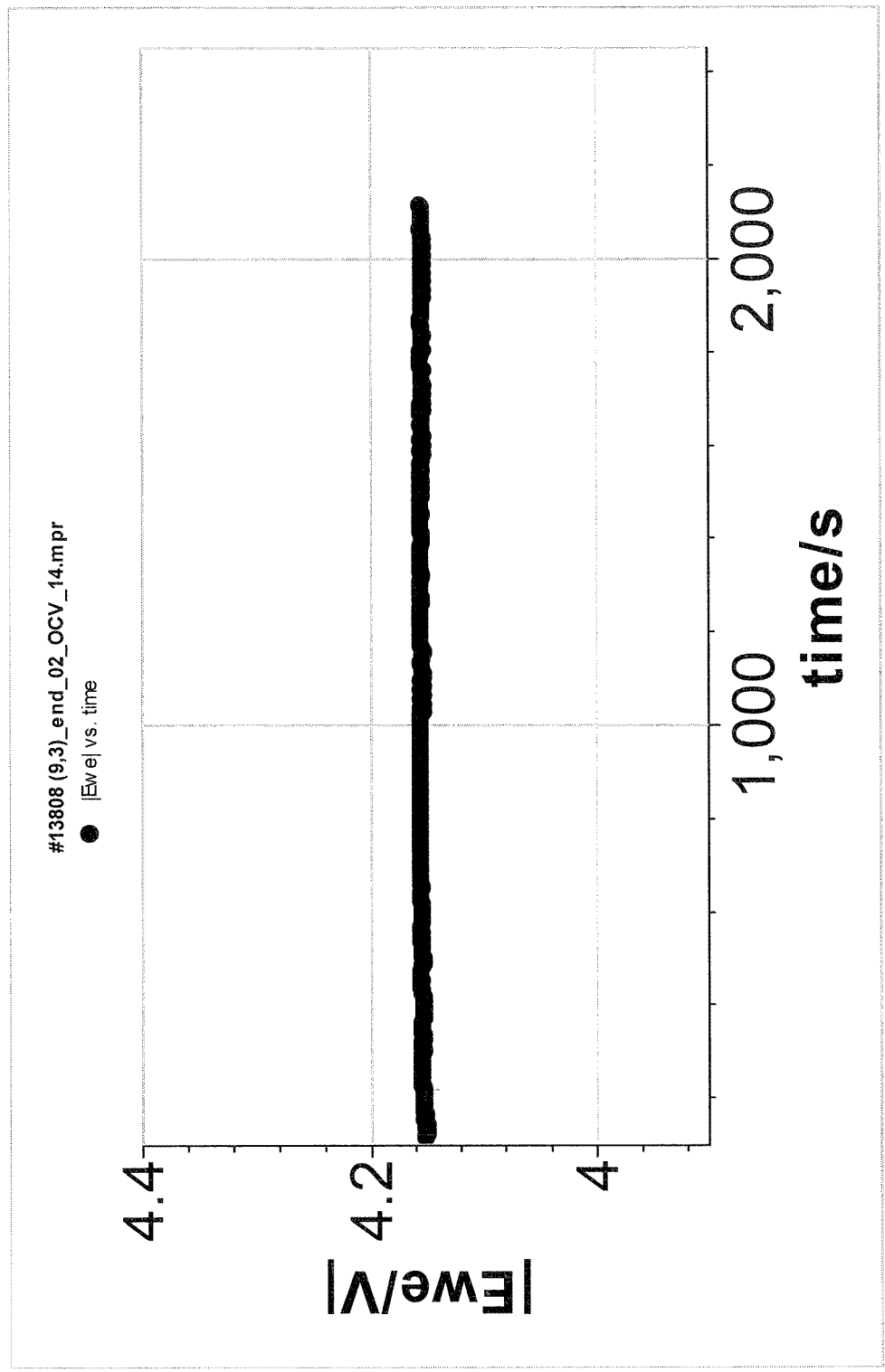
FIG. 1. Open circuit voltage of a LMO/LiBSiO/Li cell measured every 5 seconds for 35 minutes.

Electrolyte
Electrolyte Composition

Described herein is a lithium borosilicate (LiBSiO) glass electrolyte. The term "glass" means a non-crystalline or amorphous solid which, when characterized by X-ray diffraction or Raman spectroscopy, does not exhibit evidence of long-range structural order. The LiBSiO glass described herein is preferably a ternary system of lithium oxide, silicon oxide and boron oxide.

As described herein, the lithium borosilicate glass comprises between 70-83 atomic % lithium based on the combined atomic percentages of lithium, boron and silicon (i.e. excluding the oxygen component). In a further embodiment, the lithium borosilicate glass comprises between 70 and 76 atomic % Li, based on Li, B and Si. In further embodiments, the lithium borosilicate glass comprises between 71 and 76 at. % Li, between 73 and 76 at. % Li, between 72 and 75 at. % Li, between 73 and 75 at. % Li, or between 79 and 83 at. % Li, each based on Li, B and Si. In all cases, it is understood that oxygen is present in amounts to form oxides and maintain charge neutrality.

As described herein, the lithium borosilicate glass preferably comprises between 1-25 atomic % boron based on the combined atomic percentages of lithium, boron and silicon (i.e. excluding the oxygen component). Preferably, the lithium borosilicate glass comprises between 5 and 20 atomic % B, based on Li, B and Si. Preferably, the lithium borosilicate glass comprises between 7.5 and 15 at. % B, based on Li, B and Si. In all cases, it is understood that oxygen is present in amounts to form oxides and maintain charge neutrality.

As described herein, the lithium borosilicate glass preferably comprises between 1-25 atomic % silicon based on the combined atomic percentages of lithium, boron and silicon (i.e. excluding the oxygen component). Preferably, the lithium borosilicate glass comprises between 5 and 20 atomic % Si, based on Li, B and Si. Preferably, the lithium borosilicate glass comprises between 6 and 17 at. % Si, based on Li, B and Si. In all cases, it is understood that oxygen is present in amounts to form oxides and maintain charge neutrality.

As per B and Si, the ratio of B:Si may be 1:1+/−0.15. Based on components Li, B and Si, the LiBSiO electrolyte may comprise 74 at. % Li, 14 at. % Si, and 12 at. % B.

The lithium borosilicate glass described herein may also be defined as a system of lithium oxide in combination with silicon oxide and/or boron oxide, wherein the mol % of said lithium borosilicate glass is between 70.9 mol % $Li_2O$—0.0 mol % $B_2O_3$—29.1 mol % $SiO_2$; 53.8 mol % $Li_2O$—0.0 mol % $B_2O_3$—46.2 mol % $SiO_2$; 83.0 mol % $Li_2O$—17.0 mol % $B_2O_3$—0.0 mol % $SiO_2$; and 70.0 mol % $Li_2O$—30.0 mol % $B_2O_3$—0.0 mol % $SiO_2$.

Preferably, the mol % of lithium borosilicate glass is between 79.6 mol % $Li_2O$—12.2 mol % $B_2O_3$—8.2 mol % $SiO_2$; 60.3 mol % $Li_2O$—12.1 mol % $B_2O_3$—27.6 mol % $SiO_2$; 73.8 mol % $Li_2O$—3.8 mol % $B_2O_3$—22.4 mol % $SiO_2$; and 62.2 mol % $Li_2O$—15.6 mol % $B_2O_3$ 22.2 mol % $SiO_2$.

Preferably, the mol % of lithium borosilicate glass is between 70.9 mol % $Li_2O$—0.0 mol % $B_2O_3$—29.1 mol % $SiO_2$; 66.7 mol % $Li_2O$—0.0 mol % $B_2O_3$—33.3 mol % $SiO_2$; 83.0 mol % $Li_2O$—17.0 mol % $B_2O_3$—0.0 mol % $SiO_2$; and 75.0 mol % $Li_2O$—25.0 mol % $B_2O_3$ 0.0 mol % $SiO_2$.

Electrochemical Stability Against Lithium

The lithium borosilicate glass as described herein is stable against lithium, where stability is characterized by an absence of evidence indicating detectable reaction or degradation Bates et al., Journal of the Electrochemical Society 144 [2] (1997) 524-533. The stability of lithium borosilicate glassy electrolyte has been measured using impedance spectroscopy and the time dependent open circuit voltage. Impedance spectroscopy has been used to demonstrate the comparability of the frequency dependent response of the battery before and after being subjected to cycling. The open circuit voltage has been measured after extended post-deposition storage and after being subjected to cycling to demonstrate the integrity of the electrolyte and its ability to withstand the electrochemical potential difference between the cathode and anode without sustaining detectable reaction or degradation leading to mechanical or chemical failure leading to an inability to maintain a non-zero potential between said positive and negative electrodes.

The inventors made the surprising discovery that a thin film battery comprising a LiBSiO electrolyte and a lithium anode can be cycled without evidence of deleterious reactions between the LiBSiO electrolyte and the anode material. Further, a stable open circuit voltage of the same thin film battery system was observed both before and after cycling of the battery. The technical effect of this discovery is that it facilitates the use of the LiBSiO electrolyte in solid state batteries configured with a deposited lithium anode or within lithium free cells whereby the lithium anode is formed in situ at the interface between the solid state LiBSiO electrolyte and the anode current collector.

Accordingly, in one embodiment, the LiBSiO glass is in contact with lithium and is electrochemically stable.

In another embodiment, the LiBSiO glass is stable against lithium and is chemically stable in contact with positive cathode active materials that are subjected to a potential of at least +3.9 V versus Li/Li$^+$, at least +4.5 V versus Li/Li$^+$, at least +5.5 V versus Li/Li$^+$ or at least +6.0 V versus Li/Li$^+$.

Electrochemical Stability at High Voltage

Electrochemical stability vs. high voltage is measured using cyclic voltammetry between two voltage limits where a current response as a function of potential is determined when a fixed rate change in potential as a function of time is applied across the sample electrodes. Electrochemical stability is characterized by a current response across the potential range that varies continuously with increasing or decreasing potential, which is to say at no point in the potential range does the current increase or decrease in magnitude independent of a change in potential value. Failure of the electrolyte during the test due to electrochemical instability would be observed as a continuously increasing magnitude of the current at a fixed potential value.

The inventors further made the surprising discovery that the LiBSiO electrolytes described herein are electrochemically stable when configured between platinum and platinum, or platinum and nickel, between potentials ranging from 0 to 10 V. The technical effect of this discovery is that the LiBSiO electrolytes may be used in batteries operating at very high voltages and delivering high power densities.

Accordingly, in another embodiment, the invention relates to a LiBSiO electrolyte that has electrochemical stability when subjected to a broad range of electrical potentials.

In another embodiment, the lithium borosilicate glass is electrochemically stable in contact with a positive cathode active material subjected to a potential of 3.6-5 V; in a further embodiment a potential of 4.5-5 V; and in a further embodiment a potential of 5.5-8.5 V. In another embodiment, the lithium borosilicate glass is stable against lithium and is electrochemically stable in contact with a positive cathode active material subjected to a potential of 3.6-5V; in a further embodiment a potential of 4.5-5 V; and in a further embodiment a potential of 5.5-8.5 V.

High Ionic Conductivity and Low Electronic Conductivity

The inventors made the further surprising discovery that the electronic conductivities of the LiBSiO electrolytes as described herein are very low while the ionic conductivity is high. The technical effect of this discovery is that the electronic conductivity of the LiBSiO electrolytes as described herein is sufficiently low that they can be used for solid state batteries having very low theoretical capacity (<0.04 µAh), based on their ability to maintain the charged state, due to the very low electronic conductivity properties (<2.0×10$^{-13}$ S/cm).

Accordingly, in another embodiment, the invention relates to a LiBSiO electrolyte that has high ionic conductivity and low electronic conductivity. In a further embodiment, the LiBSiO electrolyte has an ionic conductivity of at least 1.0×10$^{-6}$ S/cm and an electronic conductivity of less than 6.0×10$^{-14}$ S/cm at 25° C. In a further embodiment, the LiBSiO electrolyte has an ionic conductivity of at least 1.0×10$^{-6}$ S/cm and an electronic conductivity of less than 5.0×10$^{-14}$ S/cm at 25° C. In a further embodiment, the LiBSiO electrolyte has an ionic conductivity of at least 1.0×10$^{-6}$ S/cm and an electronic conductivity of less than 4×10$^{-14}$ S/cm at 25° C. In a further embodiment, the LiBSiO electrolyte has an ionic conductivity of at least 1.0×10$^{-6}$ S/cm and an electronic conductivity of less than 2.0×10$^{-14}$ S/cm at 25° C.

In a further embodiment, the LiBSiO electrolyte has an ionic conductivity of at least 3.0×10$^{-6}$ S/cm and an electronic conductivity of less than 6.0×10$^{-14}$ S/cm at 25° C. In a further embodiment, the LiBSiO electrolyte has an ionic conductivity of at least 3.0×10$^{-6}$ S/cm and an electronic conductivity of less than 5.0×10$^{-14}$ S/cm at 25° C. In a further embodiment, the LiBSiO electrolyte has an ionic conductivity of at least 3.0×10$^{-6}$ S/cm and an electronic conductivity of less than 4×10$^{-14}$ S/cm at 25° C. In a further embodiment, the LiBSiO electrolyte has an ionic conductivity of at least 3.0×10$^{-6}$ S/cm and an electronic conductivity of less than 2.0×10$^{-14}$ S/cm at 25° C.

In a further embodiment, the LiBSiO electrolyte has an ionic conductivity of at least 5.0×10$^{-6}$ S/cm and an electronic conductivity of less than 6.0×10$^{-14}$ S/cm at 25° C. In a further embodiment, the LiBSiO electrolyte has an ionic conductivity of at least 5.0×10$^{-6}$ S/cm and an electronic conductivity of less than 5.0×10$^{-14}$ S/cm at 25° C. In a further embodiment, the LiBSiO electrolyte has an ionic conductivity of at least 5.0×10$^{-6}$ S/cm and an electronic conductivity of less than 4×10$^{-14}$ S/cm at 25° C. In a further embodiment, the LiBSiO electrolyte has an ionic conductivity of at least 5.0×10$^{-6}$ S/cm and an electronic conductivity of less than 2.0×10$^{-14}$ S/cm at 25° C.

In another embodiment, the above LiBSiO electrolyte is stable against lithium. In another embodiment, the above LiBSiO electrolyte is electrochemically stable against lithium and electrochemically stable in contact with a positive cathode active material subjected to a potential of 3.6-5 V. In another embodiment, the above LiBSiO electrolyte is electrochemically stable against lithium and electrochemically stable in contact with a positive cathode active material subjected to a potential of 5.5-8.5 V.

Lithium Borosilicate Surface-Modified Electrode

Degradation of an electrode active material can be caused by reactions with an electrolyte, electrolyte solution or atmosphere; by mechanical stress; or otherwise. For example, lithium metal is highly reactive. Reactions occur during cycling of a battery with a Li-based electrode due to reduction of solvents, active species, or impurities in the electrolyte. These and other reactions lead to the degradation of the electrodes, loss of electrode capacity, consumption of electrolyte and active materials, and eventual battery failure. An additional failure mode is the growth of dendritic lithium at the surface of the lithium anode (due to non-uniform current densities provided by surface defects) leading to capacity loss, arising from generation of detached lithium, and cell death by shorting of the electrodes, a process which may be mitigated by the placement of a solid state electrolyte at the interface between the lithium and the liquid electrolyte. There is need for a material with a high ion conductivity, a low electronic conductivity, that is stable in contact with lithium, and can be used as a protective coating for an electrode. There is further a need for a battery with electrodes having improved stability and cycling.

Accordingly, a second aspect the invention provides an electrode a surface of which is modified by a LiBSiO material as described herein. The LiBSiO-surface-modified electrode has improved stability and/or improved cycling over uncoated electrode. In one embodiment, the LiBSiO-surface-modified electrode is a LiBSiO-surface-modified negative electrode. In another embodiment, the LiBSiO-surface-modified electrode is a LiBSiO-surface-modified positive electrode.

As used herein, the term "surface-modified" and "a surface of which is modified by" means that at least a portion of a surface of the electrode is in mechanical or chemical contact with the LiBSiO composition described herein.

The electrode active material of the electrode is not particularly limited as long as the material allows the LiBSiO to attach a surface thereto, and is capable of storing and releasing lithium ions. Examples of the electrode active material includes, but is not limited to, those described elsewhere in the instant specification. In a preferred embodiment, the negative electrode active material is lithium metal.

In some embodiments, the electrode is a lithium intercalation electrode. As used herein, the term "intercalation" refers to the reversible inclusion or insertion of a molecule or ion into compounds with layered structures. Therefore, a lithium intercalation electrode may be an electrode in which lithium ions may be reversibly included or inserted into a layered structure, e.g. graphite.

In some embodiments, the electrode is coated with a layer of LiBSiO material as described herein. In some embodiments, the lithium borosilicate composition described herein is provided as a layer on the surface of the electrode.

In some embodiments, a surface of the electrode is coated with a layer of LiBSiO material as described herein. This coating may be achieved by first casting an electrode comprising electrode active material (and optionally carbon additive, polymer binder and/or solvent) on a current collector, and then curing and drying the electrode. The surface of the cast electrode may then have a protective layer of the LiBSiO material deposited thereon. In some embodiments, the LiBSiO entirely coats the surface of the electrode. In some embodiments, the LiBSiO partially covers the surface of the electrode.

In some embodiments, the electrode comprises particles of electrode active material, wherein the particles are coated with a layer of the LiBSiO material as described herein. This may be achieved by coating the entirety of each particle of active material with the protective LiBSiO material. The protected particles may then be optionally mixed with carbon additive, polymer binder and/or solvent and formed into a slurry. The slurry may then be cast onto an electronically conducting current collector.

The thickness of the LiBSiO-coat layer is not particularly limited as long as it improves stability or improves cycling of the electrode. In one embodiment, the thickness of the LiBSiO-coat layer is between 2 nm to 100 nm. In a further embodiment, the range is between 2 nm to 50 nm.

In one embodiment, the LiBSiO-surface-modified electrode comprises a LiBSiO-coat layer that coats a surface of the electrode and through which lithium ions may move. In one embodiment, the electrode surface is entirely coated with LiBSiO. In another embodiment, an electrode surface that is in contact with an electrolyte (especially a non-solid state electrolyte) is coated with LiBSiO.

Battery

The inventors made the surprising discoveries that the lithium borosilicate glass as described herein has 1) a high ionic conductivity coupled with low electronic conductivity, 2) is electrochemically stable in contact with very reducing electrodes, such as a metallic lithium anode, and very oxidizing electrodes, such as a charged $Li_{0.5}CoO_2$ cathode at 4.2 V versus $Li/Li^+$, and 3) is electrochemically stable at high voltages.

Accordingly, a third aspect of the invention relates to a battery comprising a positive electrode, a negative electrode, and an electrolyte between said positive electrode and said negative electrode, wherein said negative electrode comprises lithium, and wherein said electrolyte is a lithium borosilicate composition as described herein. Accordingly, a fourth aspect of the invention relates to a battery comprising a positive electrode, a negative electrode, and an electrolyte between said positive electrode and said negative electrode, wherein said electrolyte is a lithium borosilicate composition as described herein, and wherein said battery has a fully charged capacity that is less than 0.5 μAh. Accordingly, a fifth aspect of the invention relates to a battery comprising a positive electrode, a negative electrode, and an electrolyte between said positive electrode and said negative electrode, wherein said positive electrode comprises a positive electrode active material selected from the group consisting of $LiCoPO_4$, $LiNi_{0.5}Mn_{1.5}O_4$, $LiMnPO_4$, $LiCoO_2$, $LiNi_{1/3}Mn_{1/3}Co_{1/3}O_2$, $LiFePO_4$, $LiNiPO_4$, $Li_2NiPO_4F$, $Li_2CoPO_4F$, $LiMnPO_4F$, $Li_2CoSiO_4$, $Li_2MnSiO_4$, $FeF_3$, $LiMn_{0.8}Fe_{0.1}Ni_{0.1}PO_4$, $Li_{1-x}VOPO_4$, and $Li_2FePO_4F$, and wherein said electrolyte is a lithium borosilicate composition as described herein.

In a further embodiment, the battery further comprises a positive electrode current collector and a negative electrode current collector. In a further embodiment, the battery further comprises a substrate. In a further embodiment, the battery is further encapsulated.

In one embodiment, the battery is a lithium ion battery. In a further embodiment, the battery is lithium ion secondary battery. In a further embodiment, the thin film battery is an all-solid state battery. In a further embodiment, the battery is a thin film battery comprising a positive electrode, an electrolyte and a negative electrode.

In one embodiment, the battery comprises multiple positive electrodes and multiple negative electrodes, such as in a stack. Electrolyte in contact with the electrodes provides ionic conductivity through the separator between electrodes of opposite polarity. The battery generally comprises current collectors associated respectively with a negative electrode and a positive electrode. The stack of electrodes with their associated current collectors and separator are generally placed within a container with the lithium borosilicate electrolyte.

In one embodiment, the battery is an improved lithium ion battery comprising a negative electrode, a positive electrode, and a lithium borosilicate electrolyte, wherein the positive electrode comprises a high voltage positive active material having an electrochemical potential of at least 3.5 V versus Li/Li$^+$; at least 4.0 V versus Li/Li$^+$; at least 4.5 V versus Li/Li$^+$; at least 5.5 V versus Li/Li$^+$; or between 6.0-8.5 V versus Li/Li$^+$.

A Li-ion battery with a lithium borosilicate electrolyte as described herein and a high voltage positive electrode allows development of a high energy/power density Li-ion battery. Furthermore, lithium borosilicate electrolytes as described herein have very high ionic conductivity, and low electrical conductivity so can provide improved performance, such as higher power and energy as well as stable low capacity. For high voltage operation, another significant aspect of the electrolyte properties is the reductive and oxidative stability. The improved reductive and oxidative stability improves cycling performance and life of the battery of the invention.

Improved battery systems are provided with a lithium borosilicate electrolyte and a high voltage positive electrode that can be used to produce a high energy and high power Li-ion battery. The positive electrodes having positive electrode active materials (cathode materials) with a potential in the range of about 3.6 to 8.5 V vs Li/Li$^+$ provide excellent performance in conjunction with a LiBSiO electrolyte.

Negative Electrode

Negative electrode active materials are used as the counter-electrode for the positive electrodes. The compositions of the positive electrode active material and the negative electrode active material determine the potential of the battery during discharge, which is the difference between the potentials of the respective half reactions.

The negative electrode active material used in the battery of the present invention may be selected from Li$_4$Ti$_5$O$_{12}$, Si, Ge, Sn, Sb, Al, Mg, Bi, Si-M (M=Mg, Al, Sn, Zn, Ag, Fe, Ni, Mn), InSb, metal oxides including; TiO$_2$, vanadium and molybdenum oxides, Ti, Nb oxides (MgTi$_2$O$_5$, TiNb$_2$O$_7$), SnO, SnO$_2$, Sb oxides, or germanates.

The negative electrode active material used in the battery of the present invention may be lithium or a lithiated transition metal oxide, such as lithium titanium oxide. The negative electrode active material may be a lithium metal alloy, including LiSi, LiSb or LiGe. The negative electrode active material may also be a carbon-containing material (such as activated carbon) capable of reversibly intercalating lithium ions, a tin containing material, a silicon-containing material, or other material.

Negative electrode active materials further include graphite, synthetic graphite, coke, fullerenes, niobium pentoxide, tin alloys, silicon (including amorphous silicon), titanium oxide, tin oxide, and lithium titanium oxide.

Negative electrode active materials comprising elemental carbon materials include graphite, synthetic graphite, coke, fullerenes, carbon nanotubes, other graphitic carbon and combinations thereof. Graphitic carbon refers to any elemental carbon material comprising substantial domains of graphene sheets.

In one embodiment, the negative electrode active material comprises lithium metal, or an alloy thereof, and the battery is a rechargeable (secondary) lithium ion battery. In a further embodiment, the negative electrode may comprise a layer of lithium metal, or a lithium-aluminum alloy. In another embodiment, the negative electrode is lithium. In another embodiment, the negative electrode is a lithium free anode. In another embodiment, the negative electrode is a lithium air anode.

In some embodiments, the electrode is a lithium intercalation electrode. As used herein, the term "intercalation" refers to the reversible inclusion or insertion of a molecule or ion into compounds with layered structures. Therefore, a lithium intercalation electrode may be an electrode in which lithium ions may be reversibly included or inserted into a layered structure, e.g. graphite.

Positive Electrode

Positive electrode active materials are used in the counter-electrode for the negative electrodes. The positive electrode may, in some embodiments, include a positive active material having a potential greater than 3.6 V vs Li/Li$^+$.

A positive electrode active material of a battery of the present invention include a lithiated transition metal compound, such as a lithium nickel manganese oxide, lithium nickel vanadium oxide, lithium cobalt vanadium oxide, or lithium cobalt phosphate, for example Li$_2$NiMn$_3$O$_8$, LiNiVO$_4$, LiCoVO$_4$, LiCoPO$_4$, and the like. Other examples include lithium nickel phosphate, lithium nickel fluorophosphate, and lithium cobalt fluorophosphate; i.e. LiNiPO$_4$, Li$_2$NiPO$_4$F, Li$_2$CoPO$_4$F, and the like. The lithium content typically varies depending on the state of charge of the battery. The positive active material may comprise other oxygen-containing materials, such as an oxide, manganate, nickelate, vanadate, phosphate, or fluorophosphate. The positive active material may have the formula Li$_x$M$_y$N$_z$O, where M is selected from a group consisting of Ni, Mn, V, and Co, and N is a heteroatomic species different from M, such as Ni, Mn, V, Co, or P. N can be omitted. The positive active material may also be fluorinated, for example as a fluorophosphate.

In one embodiment, the positive electrode active material of a battery of the present invention is selected from the group consisting of LiCoO$_2$, FeS$_2$, LiCoPO$_4$, LiFePO$_4$, Li$_2$FeS$_2$, Li$_2$FeSiO$_4$, LiMn$_2$O$_4$, LiMnPO$_4$, LiNiPO$_4$, LiV$_3$O$_8$, LiV$_8$O$_{13}$, LiVOPO$_4$, LiVOPO$_4$F, Li$_3$V$_2$(PO$_4$)$_3$, MnO$_2$, MoS$_3$, S, TiS$_2$, TiS$_3$, V$_2$O$_5$, V$_6$O$_{13}$, LiNi$_{0.5}$Mn$_{1.5}$O$_4$, and LiMnNiCoAlO$_2$.

In another embodiment, the positive electrode active material of a battery of the present invention is high voltage positive electrode active materials. In a further embodiment, the high voltage positive electrode active material is selected from the group consisting of LiCoPO$_4$, LiNi$_{0.8}$Mn$_{1.8}$O$_4$, LiMnPO$_4$, LiMn$_2$O$_4$, LiCoO$_2$, LiNi$_{1/3}$Mn$_{1/3}$CO$_{1/3}$O$_2$, LiFePO$_4$, LiNiPO$_4$, Li$_2$NiPO$_4$F, Li$_2$CoPO$_4$F, LiMnPO$_4$F, Li$_2$CoSiO$_4$, Li$_2$MnSiO$_4$, FeF$_3$, LiMn$_{0.8}$Fe$_{0.1}$Ni$_{0.1}$PO$_4$, Li$_{1-x}$VOPO$_4$ and Li$_2$FePO$_4$F.

In another embodiment, the positive electrode comprises a positive electrode active material having a chemical formula:

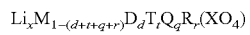

Li$_x$M$_{1-(d+t+q+r)}$D$_d$T$_t$Q$_q$R$_r$(XO$_4$)

wherein:

M is a cation of a metal selected from the group consisting of Fe, Mn, Co, Ti, Ni or mixtures thereof;

D is a metal having a +2 oxidation state selected from the group consisting of Mg$^{2+}$, Ni$^{2+}$, Co$^{2+}$, Zn$^{2+}$, Cu$^{2+}$, and Ti$^{2+}$;

T is a metal having a +3 oxidation state selected from the group consisting of Al$^{3+}$, Ti$^{3+}$, Cr$^{3+}$, Fe$^{3+}$, Mn$^{3+}$, Ga$^{3+}$, Zn$^{3+}$, and V$^{3+}$;

Q is a metal having a +4 oxidation state selected from the group consisting of Ti$^{4+}$; Ge$^{4+}$; Sn$^{4+}$, and V$^{4+}$;

R is a metal having a +5 oxidation state selected from the group consisting of V$^{5+}$; Nb$^{5+}$, and Ta$^{5+}$;

X comprises Si, S, P, V or mixtures thereof;

0≤x≤1; and

0≤d, t, q, r≤1, where at least one of d, t, q, and r is not 0.

In another embodiment, the positive electrode active material comprises a positive electrode active material comprises an ordered olivine electrode compound selected from $LiFePO_4$, $LiMnPO_4$, $LiCoPO_4$, $LiNiPO_4$, mixed transition-metal compounds such as $Li_{1-2x}Fe_{1-x}Ti_xPO_4$ or $LiFe_{1-x}Mn_xPO_4$, where $0<x<1$, or other compounds having the general formula $LiMPO_4$ and an ordered olivine structure.

In general, "isocharge substitutions" refers to substitution of one element on a given crystallographic site with an element having a similar charge. For example, $Mg^{2+}$ is considered similarly isocharge with $Fe^{2+}$, and $V^{5+}$ is similarly isocharge with $P^{5+}$. Likewise, $PO_4^{3-}$ tetrahedra can be substituted with $VO_4^{3-}$ tetrahedra. "Aliovalent substitution" refers to substitution of one element on a given crystallographic site with an element of a different valence or charge. One example of an aliovalent substitution would be $Cr^{3+}$ or $Ti^{4+}$ on an $Fe^{2+}$ site. Another example would be $Li^+$ on a $Fe^{2+}$ site. These positive electrode active materials will generally have an olivine structure based on iron or manganese derivatives whose general formula is:

$$Li_{x+y}M_{1-(y+d+t+q+r)}D_dT_tQ_qR_r[PO_4]_{1-(p+s+v)}[SO_4]_p[SiO_4]_s[VO_4]_v$$

where

M may be $Fe^{2+}$ or $Mn^{2+}$ or mixtures thereof;

D may be a metal in the +2 oxidation state, preferably $Mg^{2+}$, $Ni^{2+}$, $Co^{2+}$, $Zn^{2+}$, $Cu^{2+}$, or $Ti^{2+}$;

T may be a metal in the +3 oxidation state, preferably $Al^{3+}$, $Ti^{3+}$, $Cr^{3+}$, $Fe^{3+}$ $Ga^{3+}$, $Zn^{3+}$, or $V^{3+}$;

Q may be a metal in the +4 oxidation state, preferably $Ti^{4+}$, $Ge^{4+}$, $Sn^{4+}$, or $V^{4+}$;

R may be a metal in the +5 oxidation state, preferably $V^{5+}$, $Nb^{5+}$, or $Ta^{5+}$;

In this further embodiment, M, D, T, Q and R reside in octahedral sites. The additional coefficients may be defined as follows: x represents the degree of intercalation during operation of the electrode material; y represents the fraction of lithium ions on the initial $Fe^{2+}$ sites; d represents the fraction of divalent ions (noted as D) on the initial $Fe^{2+}$ sites; t represents the fraction of trivalent ions (noted as T) on the initial $Fe^{2+}$ sites; q represents the fraction of tetravalent ions (noted as 0) on the initial $Fe^{2+}$ sites; r represents the fraction of pentavalent ions (noted as R) on the initial $Fe^{2+}$ sites; p represents the fraction of hexavalent sulfur (as discrete $SO_4^{2-}$ tetrahedra) on the initial $P^{5+}$ sites; s represents the fraction of tetravalent silicon (as discrete $SiO_4^{2-}$ tetrahedra) on the initial $P^{5+}$ sites; and v represents the fraction of pentavalent vanadium ions on the initial $P^{5+}$ sites.

The conditions for site occupancy and electroneutrality imply the following:

$0 \leq x \leq 1$;

$y+d+t+q+r \leq 1$;

$P+s+v<1$; and $3+s-p=x-y+t+2q+3r$.

x, y, d, t, q, r, p, s, and v may be between 0 (zero) and 1 (one), with at least one of y, d, t, q, r, p, s, or v differing from 0. In a preferred embodiment y, d, t, q, r, and v may vary between 0 (zero) and 0.2 ({fraction (2/10)}) and r and s may vary between 0 (zero) and 0.5 (½). In some embodiments, the electrode is a lithium intercalation electrode. As used herein, the term "intercalation" refers to the reversible inclusion or insertion of a molecule or ion into compounds with layered structures. Therefore, a lithium intercalation electrode may be an electrode in which lithium ions may be reversibly included or inserted into a layered structure, e.g. graphite.

The battery of the invention may contain an intercalation material with fast diffusion kinetics in the positive electrode containing the $Li_{x+y}M_{1-(y+d+t+q+r)}D_dT_tQ_qR_r[PO_4]_{1-(p+s+v)}[SO_4]_p[SiO_4]_s[VO_4]_v$ material described. The phrase "fast diffusion kinetics" is generally understood in the art as referring to a material able to sustain a specific current of at least 10 mA per gram of material with more than 80% utilization of the capacity at the temperature of operation. Preferably, the intercalation material with fast diffusion kinetics may be a lamellar dichalcogenide, a vanadium oxide $VO_x$ where $2.1 \leq x \leq 2.5$, or a NASICON-related material such as $Li_3Fe_2(PO_4)_3$ or $Li_{3-x}Fe_{2-x}Ti_x(PO_4)_3$ where x represents the degree of substitution of $Fe^{3+}$ by $Ti^{4+}$.

The positive electrode active materials described herein can have a specific discharge capacity of at least about 50 mAh/g at a discharge rate of C/3 at the 10th discharge cycle at room temperature when discharged from 8.5 volts to 1 volts.

Current Collector

A current collector (electron collector) can be an electrically conductive member comprising a metal, conducting polymer, or other conducting material. A current collector for a battery of the present invention may comprise a metal such as Cu, Pt, Au, Al, Ni, Fe, Ti, Mo, stainless steel, or other metal or alloy. The electron collector may have an additional layer to reduce corrosion, for example an additional layer comprising tungsten (W), platinum (Pt), palladium (Pd), titanium carbide (TiC), tantalum carbide (TaC), titanium oxide (for example, $TiO_2$ or $Ti_4O_7$), copper phosphide ($Cu_2P_3$), nickel phosphide ($Ni_2P_3$), iron phosphide (FeP), and the like, or may comprise particles of such materials.

Electrochemical Stability

It may be desirable to operate a battery at high voltages to provide for higher capacity and/or to provide greater power output. With an improved lithium borosilicate glass electrolyte described herein, the properties of the high voltage batteries can be significantly improved. For example, the battery can have a longer cycle life.

For high voltage operation, another significant aspect of the electrolyte is the reductive and oxidative stability. The improved reductive and oxidative stability improves cycling performance of the corresponding battery. The lithium borosilicate glass electrolytes described herein do not react terminally (reduce or oxidize) at the operational voltages of the battery. The lithium borosilicate glass electrolytes have the capability of operating at high voltages, for example, against lithium or elemental carbon negative electrode active materials. The improved electrolytes described herein can be effective to improve the cycling performance of lithium ion batteries in operation at high charge voltages above 4.45 V.

Accordingly, in another embodiment, the invention relates to a battery comprising a lithium borosilicate glass electrolyte that is capable of operation at high voltages. In a further embodiment, the high voltage battery comprises a lithium borosilicate glass electrolyte that is capable of operation at up to 4.45 V, at least 5 V, at least 5.5 V, at least 6 V, at least 7 V, at least 8 V, at least 9 V or at least 10 V. In a further embodiment, the lithium borosilicate glass electrolyte has an ionic conductivity of greater than $1.0 \times 10^{-6}$ S/cm at 25° C. In a further embodiment, the lithium borosilicate glass electrolyte is stable against lithium. In a further embodiment, the lithium borosilicate glass electrolyte is between 0.05-15 microns thick, between 0.3-4 microns thick, or between 2-4 microns thick. In a further embodiment, the battery comprises a lithium anode or is a lithium free battery.

High Ionic and Low Electronic Conductivity

In another embodiment, the invention provides for a battery comprising a lithium borosilicate glass electrolyte that has a high ionic conductivity and a low electronic conductivity. In one embodiment, the lithium borosilicate glass electrolyte has an ionic conductivity of greater than $1.0 \times 10^{-6}$ S/cm and an electronic conductivity of less than $8.6 \times 10^{-14}$ S/cm. In a further embodiment, the battery has an ionic conductivity of greater than $1.0 \times 10^{-6}$ S/cm and an electronic conductivity of less than $8.6 \times 10^{-14}$ S/cm and is capable of operation at up to 4.45 V, at least 5 V, at least 5.5 V, at least 6 V, at least 7 V, at least 8 V, at least 9 V or at least 10 V. In a further embodiment, the battery has an ionic conductivity of greater than $1.0 \times 10^{-6}$ S/cm and an electronic conductivity of less than $8.6 \times 10^{-14}$ S/cm and is capable of operation at up to 4.45 V and comprises a lithium anode or is a lithium free battery. In a further embodiment, the battery is an all solid state, thin film, lithium ion battery.

In another embodiment, the battery comprising a lithium borosilicate glass electrolyte has an ionic conductivity of greater than $1.0 \times 10^{-6}$ S/cm and an electronic conductivity of less than $8.6 \times 10^{-14}$ S/cm and has a fully charged capacity that is between 0.04-5 µAh. In a further embodiment, the battery has a fully charged capacity that is less than 0.5 µAh. In a further embodiment, the battery has a fully charged capacity that is less than 0.1 µAh.

Battery Comprising a Lithium Borosilicate Surface-Modified Electrode

One aspect of the invention relates to a battery comprising a positive electrode, a negative electrode, and an electrolyte between said positive electrode and said negative electrode, wherein a surface of the positive electrode and/or negative electrode is modified by a LiBSiO composition described herein. The LiBSiO composition may consist essentially of a system of lithium oxide in combination with silicon oxide and/or boron oxide, wherein said lithium borosilicate comprises between 70-83 atomic % lithium based on the combined atomic percentages of lithium, boron and silicon, and wherein said lithium borosilicate is a glass. Preferably, the lithium borosilicate composition consists essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass. In one embodiment, the battery comprises a LiBSiO-surface-modified negative electrode. In another embodiment, the battery comprises a LiBSiO-surface-modified positive electrode.

In one embodiment, the battery comprises a positive electrode, a negative electrode, and an electrolyte between said positive electrode and said negative electrode, wherein the positive electrode and/or negative electrode is coated with a layer of a LiBSiO composition of the present invention.

In one embodiment, the invention provides a battery comprising a positive current collector, a positive electrode comprising a positive electrode active material, an electrolyte, a negative electrode comprising a negative electrode active material, and a negative current collector, wherein a surface of the positive electrode and/or negative electrode is modified by a LiBSiO material as described herein. In one embodiment, the battery comprises a LiBSiO-surface-modified negative electrode. In another embodiment, the battery comprises a LiBSiO-surface-modified positive electrode. In another embodiment, the battery comprises a LiBSiO-surface-modified negative electrode and a LiBSiO-surface-modified positive electrode. In a further embodiment, the battery is a lithium ion secondary battery. In another embodiment, the lithium ion secondary battery is a thin-film battery.

In one embodiment, the invention provides a battery comprising a positive current collector, a positive electrode comprising a positive electrode active material, an electrolyte, a negative electrode comprising a negative electrode active material, and a negative current collector, wherein the positive electrode and/or negative electrode is coated with a LiBSiO material of the present invention, e.g., according to the first aspect. In one embodiment, the battery comprises a LiBSiO-coated negative electrode. In another embodiment the battery comprises a LiBSiO-coated positive electrode. In another embodiment, the battery comprises a LiBSiO-coated negative electrode and a LiBSiO-coated positive electrode. In a further embodiment, the battery is a lithium ion secondary battery. In another embodiment, the lithium ion secondary battery is a thin-film battery.

The electrolyte may comprise an organic electrolyte, liquid electrolyte, an ionic liquid, a gel electrolyte, room temperature molten salt, or a solid electrolyte. If the electrolyte is a liquid or gel, then preferably it is a non-aqueous electrolyte. In one embodiment, the electrolyte is an organic electrolyte. In another embodiment, the electrolyte is a liquid electrolyte. In a further embodiment, the liquid electrolyte is a non-aqueous electrolyte. In another embodiment, the electrolyte is a gel electrolyte. In another embodiment, the electrolyte is a molten salt electrolyte. In another embodiment, the electrolyte is a solid electrolyte.

In a further embodiment the liquid, non-aqueous electrolyte comprises a lithium salt and a non-aqueous solvent. Examples of lithium salts include $LiPF_6$, $LiBF_4$, lithium bis(trifluoromethanesulfonyl)amide (LiTFSA, LiN$(CF_3SO_2)_2$), $LiCF_3SO_3$, $LiC_4F_9SO_3$, $LiC(CF_3SO_2)_3$, $LiClO_4$, lithium bis(oxalato)borate (LiBOB), lithium bis(trifluoromethanesulfonyl)imide (LiTFSI), lithium bis(fluorosulfonyl)amide (LiFSA, LiN$(SO_2F)_2$), and $LiCF_3CO_2$. The non-aqueous solvent is capable of dissolving the lithium salt. Examples of the non-aqueous solvent include propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethyl formamide, dimethyl sulfoxide, sulfolane, vinylene carbonate, and γ-butyrolactone.

In some embodiments, the electrolyte comprises an additive. The electrolyte additive may modify the electrode-electrolyte interface easily and economically. In some embodiment, the electrolyte comprises an additive selected from the group consisting of 4-(trifluoromethyl)-1,3-dioxolan-2-one (TFM-EC), tris(hexafluoro-iso-propyl)phosphate (HFip), 3-hexylthiophene, LiDFOB, tris(trimethylsilyl)phosphate (TMSP), tris(trimethylsilyl)borate (TMSB), and combinations thereof.

Methods of Making Lithium Borosilicate

A ninth aspect provides for a method of making the lithium borosilicate glass described herein. In one embodiment, the lithium borosilicate glass is formed by a vacuum deposition process. In a further embodiment, the lithium borosilicate glass is formed by a physical vapor deposition process.

Physical vapour deposition processes are generally known to those skilled in the art. In the present invention, the process typically comprises the use of a physical process (such as heating) to produce a vapour including the component elements Li, B, Si and O, which is then deposited on the substrate. In one embodiment, the physical vapour deposition process is carried out at a temperature of between 100 and 400° C., preferably 150 to 300° C., and more preferably 200 to 250° C.

In one embodiment, the physical vapour deposition process is carried out at a pressure of between $4.0\times10^{-4}$ and $6.7\times10^{-3}$ Pa ($3\times10^{-6}$ and $5\times10^{-5}$ Torr), preferably between $2.7\times10^{-3}$ and $4.7\times10^{-3}$ Pa ($2\times10^{-5}$ and $3.5\times10^{-5}$ Torr).

In one embodiment, the oxygen source may be an ozone source of oxygen, an atomic source of oxygen or molecular source of oxygen.

In one embodiment, the invention relates to a method of making a lithium borosilicate electrolyte that is electrochemically stable against lithium. In a further embodiment, the battery comprises a lithium anode.

In another embodiment, the invention relates to a method of making a lithium borosilicate electrolyte that is capable of operation at high voltages. In a further aspect, the battery is suitable for longer term cycling.

In another embodiment, the invention relates to a method of making a lithium borosilicate electrolyte that has low electronic conductivity. In a further embodiment, the battery has a low capacity.

Method of Making a Lithium Borosilicate Coated Electrode

A further aspect provides for a method of making a LiBSiO-surface-modified electrode. The method of making the LiBSiO-surface-modified electrode of the invention is not particularly limited as long as the method is able to provide a desired LiBSiO-surface-modified electrode that improves stability or improves cycling of the electrode. Examples of the method include PVD as described herein. In one embodiment, the method is a method of making a LiBSiO-surface-modified negative electrode. In another embodiment, the method is a method of making a LiBSiO-surface-modified positive electrode. In one embodiment, the LiBSiO coating is produced by physical vapour deposition (PVD).

Methods of Making a Battery Comprising a Lithium Borosilicate Glass Electrolyte

A further aspect of the invention relates to a method of making a battery comprising a lithium borosilicate glass electrolyte.

In another embodiment, the thin film battery is produced by sequentially forming films of constituents in all-solid state.

Method of Making a Battery Comprising a Lithium Borosilicate Coated Electrode

A further aspect provides for a method of making a battery comprising an electrode the surface of which is modified with a LiBSiO material described herein. In one embodiment, the method is a method of making a battery comprising a LiBSiO-surface-modified negative electrode. In another embodiment, the method is a method of making a battery comprising a LiBSiO-surface-modified positive electrode. In a further embodiment, the battery is a lithium ion secondary battery. In another embodiment, the lithium ion secondary battery is a thin-film battery.

EXAMPLES

Example 1—Preparing a LiBSiO Electrolyte

In accordance with embodiments of the invention, lithium borosilicate material was formed from the component elements lithium, oxygen and two glass-forming elements, boron and silicon using the method disclosed in WO2015/104540, entitled 'Vapour Deposition Method for Preparing Amorphous Lithium-Containing Compounds', incorporated herein by reference in its entirety. Lithium borosilicate was fabricated by providing a vapour source of each component element of the compound and co-depositing the component elements from the vapour sources onto a substrate heated to 225° C. at a pressure from $2.7\times10^{-3}$ to $4.3\times10^{-3}$ Pa ($2\times10^{-5}$ to $3.2\times10^{-5}$ Torr). The component elements reacted on the substrate to form the amorphous lithium borosilicate compound. The compounds produced had the compositions described in Example 5 below.

The deposition was carried out in a physical vapour deposition (PVD) system which was previously described in the literature (Guerin, S. and Hayden, B. E., Journal of Combinatorial Chemistry 8 (2006) 66-73). All samples were deposited utilizing an oxygen plasma source as a source of atomic oxygen. The oxide materials, lithium silicate and lithium borate, require the highest oxidation states of both silicon and boron (4+ and 3+ respectively), and the use of atomic oxygen rather than molecular oxygen therefore removes the dissociation step required to break $O_2$ to 2O and provides a highly reactive species to oxidize silicon and boron into their highest oxidation states, as required in the materials $Li_4SiO_4$ and $Li_3BO_3$. Lithium was deposited from a Knudsen cell source. Silicon and boron were both deposited from electron gun (E-Gun) sources.

The use of other vacuum deposition methods may be used for the fabrication of the cathode, anode, current collectors and first barrier layer materials. This may include but is not limited to physical vapour deposition, chemical vapour deposition (CVD), RF sputtering, molecular beam epitaxy solid state reaction, pulsed laser deposition (PLD), sol-gel, and atomic layer deposition (ALD).

In the case of the present invention a battery could be constructed by sequential deposition of an appropriate chemical compound onto a suitable, electrically conductive substrate. For example, sequential deposition of an anode layer (e.g., Li metal from a Li evaporation source), an electrolyte layer (e.g., lithium borosilicate prepared using the method disclosed herein), a cathode layer (e.g., LMO from component evaporation sources), and an electrically conductive top layer could be carried out to provide the layered structure of a thin film battery.

Example 2—Electrochemical Stability of LiBSiO Electrolyte

A thin film battery was made with a platinum cathode current collector, a $LiMn_2O_4$ cathode, a lithium borosilicate glass electrolyte, and an Li anode. The stability of the lithium borosilicate glass electrolyte was exemplified in three ways.

Example 3—Stability Against Lithium Anode

First, the battery was cycled between 3.6 and 4.25 V using linear sweep voltammetry at rates between 0.5 and 0.25 mV/s and then observed for deleterious reactions between the electrolyte and the anode materials. After 100 cycles, there was no evidence in the profile of the current as a function of potential to suggest the presence of deleterious reactions between the electrolyte and the anode materials.

Example 4—Stable OCV

Second, a stable open circuit voltage (OCV) of the same thin film battery system was observed both before and after cycling of said battery. The open circuit voltage at beginning of life, measured 40 days after the deposition of the anode on the LiBSiO solid state electrolyte was determined to range from 2.36 to 2.92 V vs. Li/Li$^+$. Had the lithium reacted in a persistent fashion with the solid state electrolyte it would eventually have consumed the LiBSiO in formation of a continuous pathway between the anode and the cathode leading to a measured OCV of 0 V.

A stable end of life (EOL) OCV of 4.15 V vs. Li/Li$^+$ was observed after being subjected to 10 constant current cycles between 3.8 and 4.25 voltage at a current of 0.1 µA, 12 cycles of cyclic voltammetry, and 23 constant current cycles between 3.8 and 4.25 V at a current of 0.2 µA.

Figure 2:
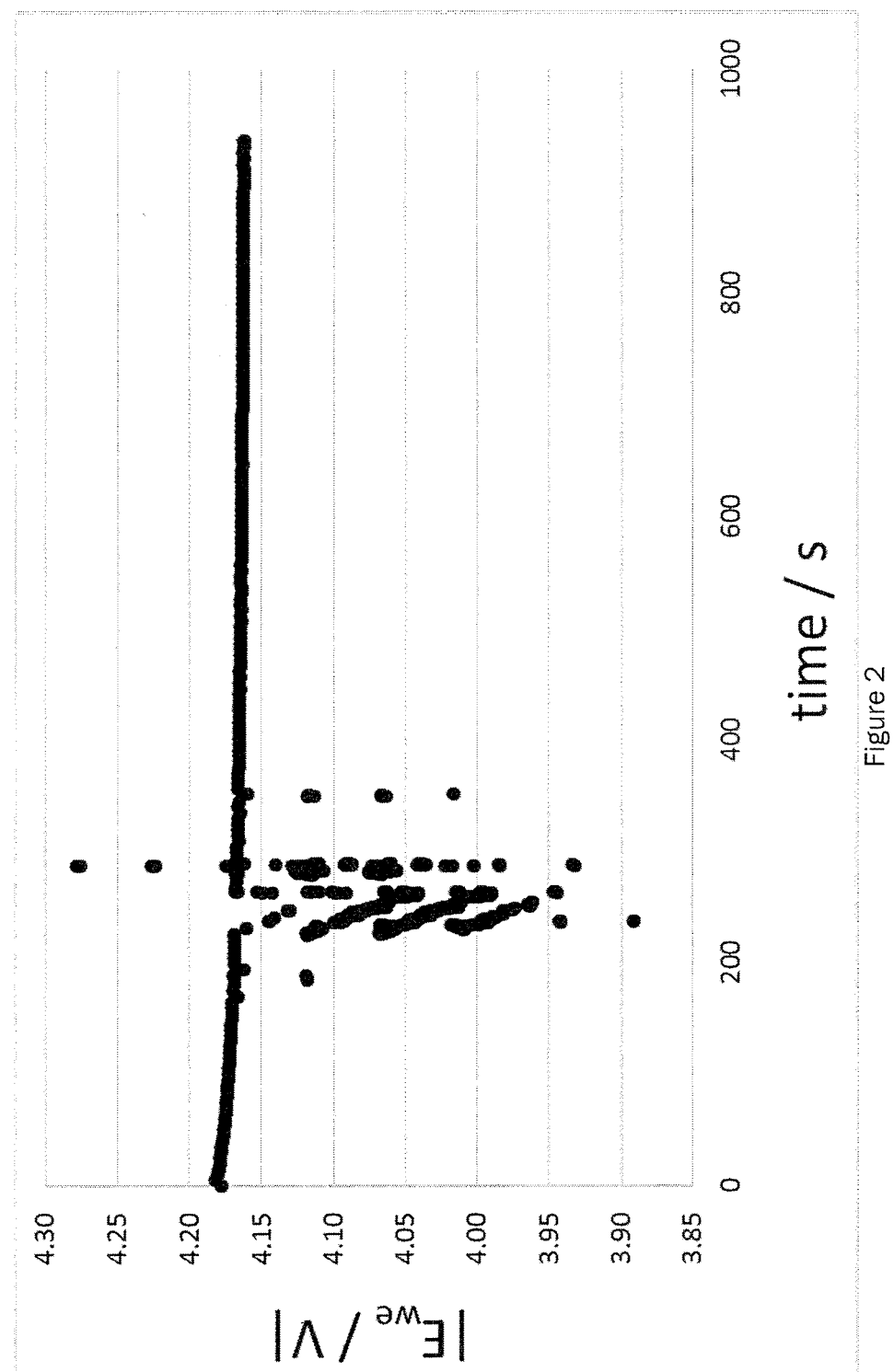
FIG. 2. Monitoring of the OCV at the top of charge for 15 minutes.

The open circuit voltage of a LMO/LiBSiO/Li cell was measured every 5 seconds for 35 minutes (FIG. 1) subsequent to completion of cycling, the final stage of which was monitoring of the OCV at the top of charge for 15 minutes (FIG. 2). The scatter observed in the data in the figure to the right was due to disruption of the measurement by external perturbations.

Figure 3:
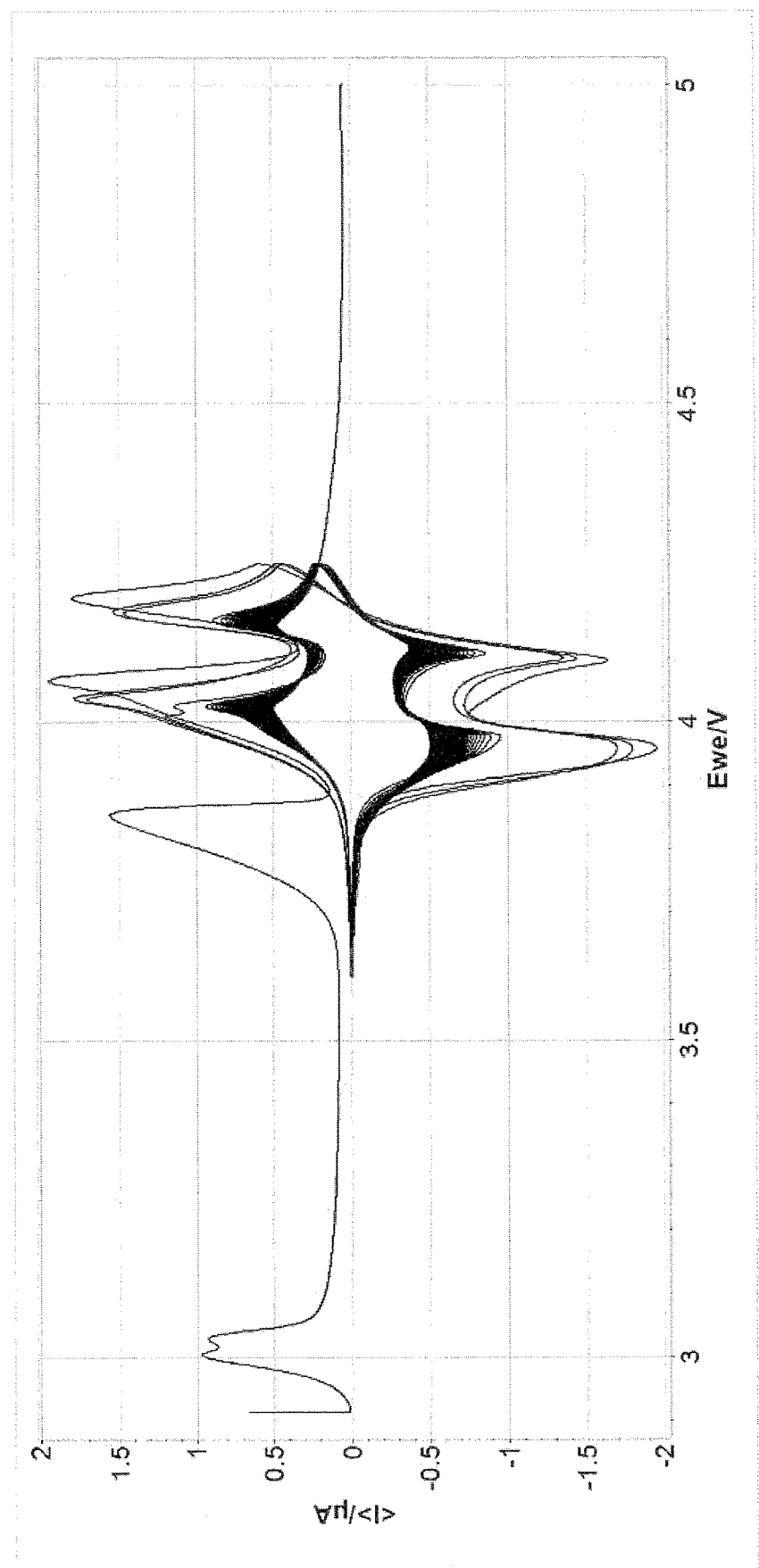
FIG. 3. Cyclic voltammetry of a solid state cell comprised of an AlOPt substrate, LMO cathode, LiBSiO electrolyte, and Li metal anode. The cell was cycled 100 times between 3.6 and 4.25 V. The first three cycles were at 0.5 mV/s, while the remaining 97 cycles were performed at a scan rate of 0.25 mV/s.

As shown in FIG. 3, cyclic voltammetry was performed on a solid state cell comprised of a AlOPt (sapphire, titanium or titania (20 nm), platinum (100 nm)) substrate, LMO cathode, LiBSiO electrolyte, and a Li metal anode. The cell was cycled 100 times between 3.6 and 4.25 V. The first three cycles were at 0.25 mV/s, while the remaining 97 cycles were performed at a scan rate of 0.5 mV/s. It can be seen that the characteristic profile of the potential dependent current does not change as within the set of data reflecting the behavior from beginning to the end of cycling. A decrease in capacity associated with reduction in current magnitude is symptomatic of cycling related aging effects but does not imply degradation or instability related to incompatibility between the electrolyte and the electrodes, but could relate to the intrinsic stability of the cathode material when subjected to the applied cycling conditions.

Example 5—Impedance

The application of impedance as a measure of stability was used by Bates et al., Journal of the Electrochemical Society, 144 [2] (1997) 524-533 where a comparison between the impedance of LiPON as sandwiched between platinum electrodes or one lithium and one platinum electrode was made.

Figure 4A:
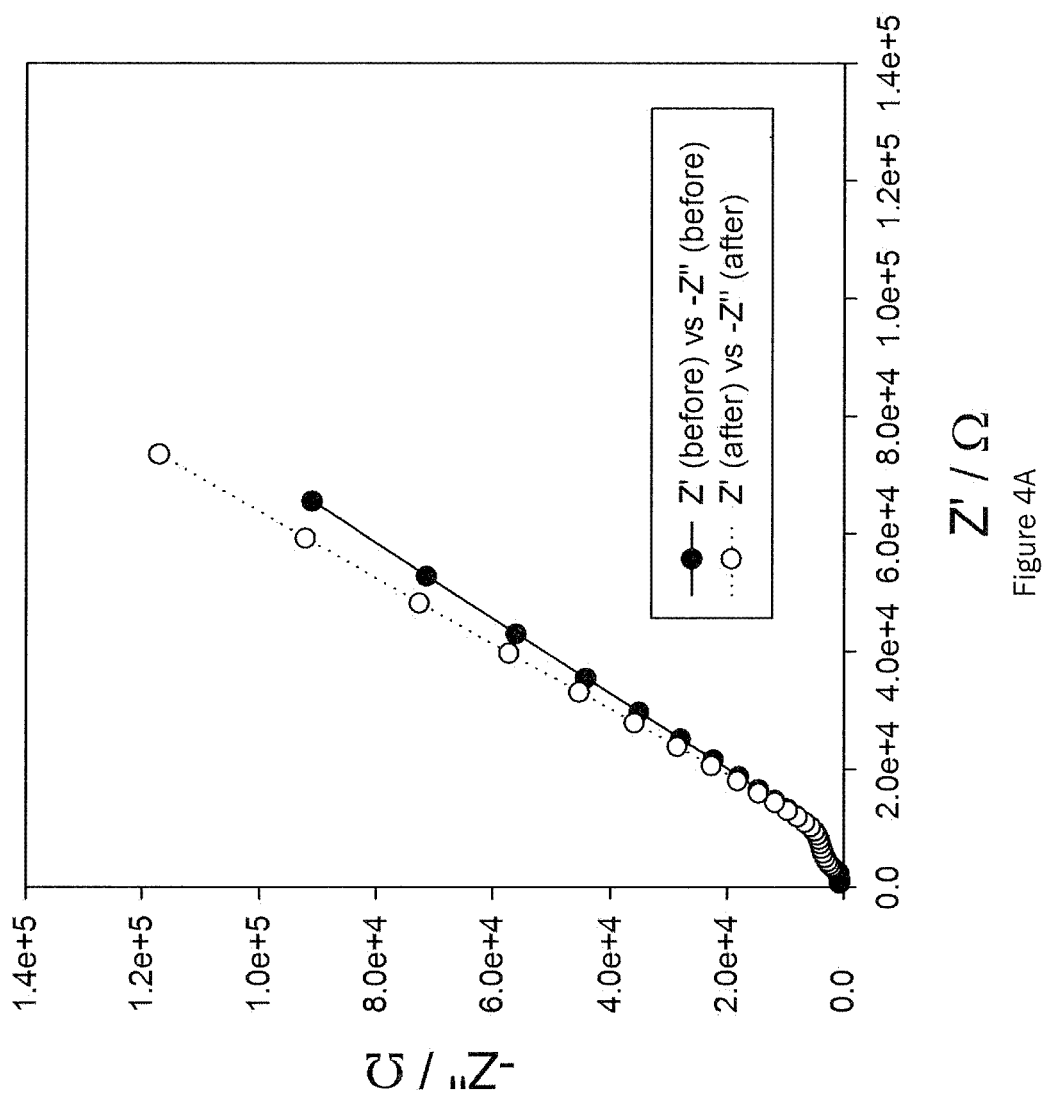
FIGS. 4A and 4B. Impedance of a solid state cell comprised of an AlOPt substrate, LMO cathode, LiBSiO electrolyte, and a Li metal anode. The measurement was performed at a potential of 3.8 V vs. Li/Li$^+$ before, and after the battery was subjected to 10 constant current cycles between 3.8 and 4.25 V at a current value of 0.1 μA. The frequency range for the measurement was 261.0156 kHz to 0.1 Hz with seven data points per decade, and ac amplitude of 10 mV, and an average over 10 cycles per frequency was used to generate the point at each frequency.
Figure 4B:
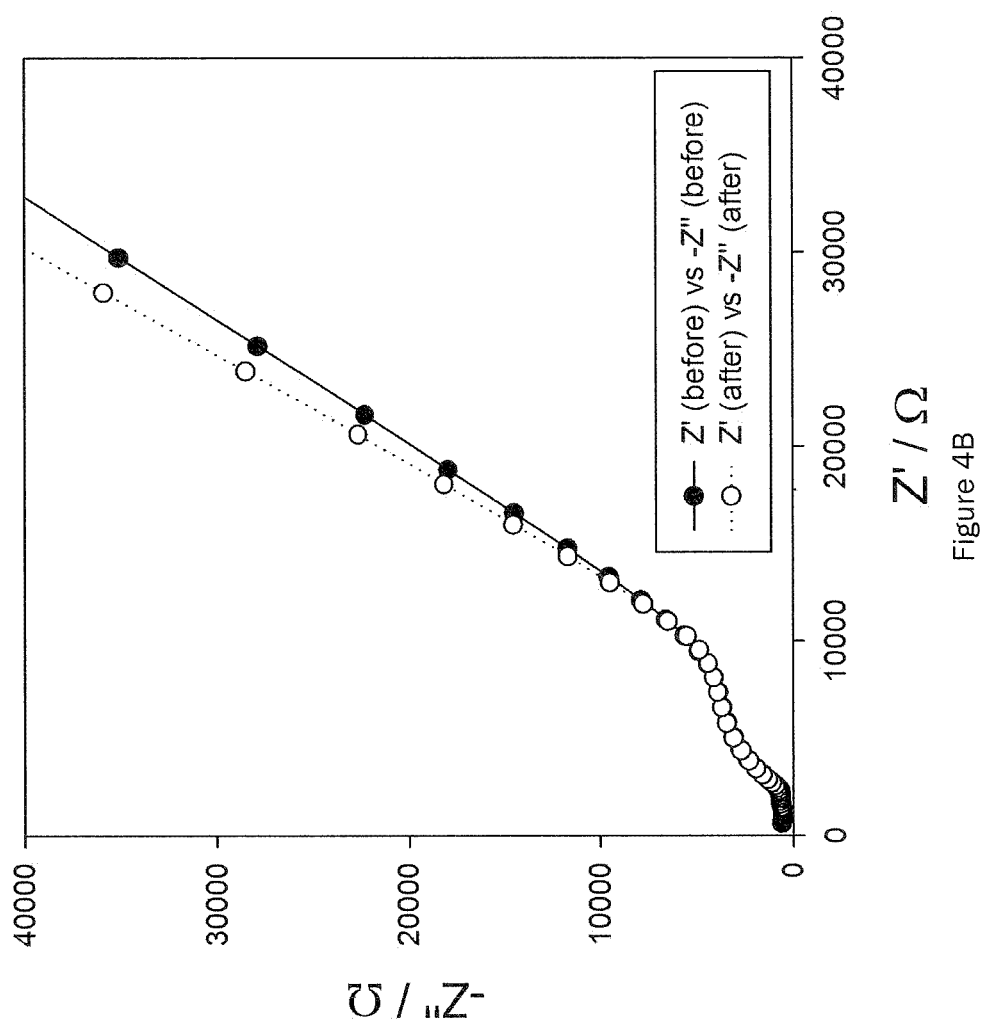
Figure 5:
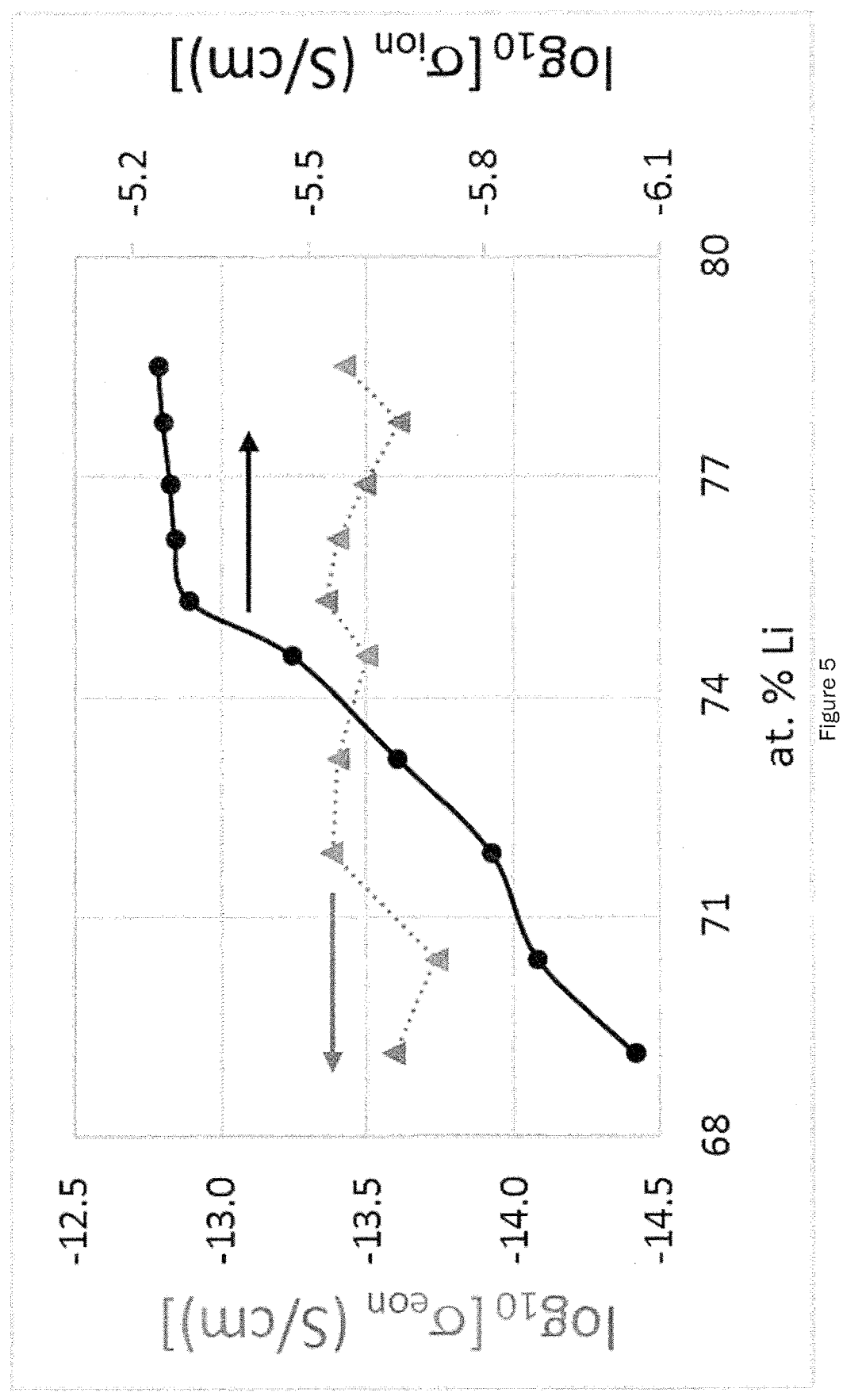
FIG. 5. Electronic conductivity (dotted lines with triangles) and ionic conductivity (solid lines with circles) of LiBSiO samples as a function of lithium content.

Impedance, in a method similar to that described in Bates et al., was measured on a LiBSiO electrolyte 72.6 mol % Li$_2$O—6.8 mol % B$_2$O$_3$—20.6 mol % SiO$_2$ sample at a potential of 3.8 V vs. Li/Li$^+$ before and after 10 constant current cycles at 0.1 µA between 3.8 and 4.25 V. Here a frequency range between 261.0156 kHz to 0.1 Hz with seven data points per decade, and an AC amplitude of 10 mV was used. As demonstrated in FIGS. 4A and B, there is little or no difference between the impedance spectra collected before and after cycling in the high frequency regime (FIG. 4A) of the data set as provided by data points below 40 kΩ (FIG. 4B) on the ordinate and abscissa axes of the plots. It is in this frequency range that the data reflect the contribution from the electrolyte and the interfaces between the electrolyte and the electrodes. As such the reproducibility of the data before and after cycling is indicative of the stability of the interface between the LiBSiO solid state electrolyte and the neighboring lithium anode.

Third, the impedance was compared before and after cycling and shown to be largely unchanged in the frequency range which reflects the contribution from the electrolyte and the interfaces between the electrolyte and the neighboring electrodes.

The technical effect of this discovery is that it facilitates the use of the lithium borosilicate glass compositions as described herein in solid state batteries configured with as deposited lithium anodes and within lithium free cells whereby the lithium anode is formed in situ at the interface between the solid state lithium borosilicate electrolyte and the anode current collector.

Example 6—Electrochemical Stability at High Voltage

A number of lithium borosilicate compositions were made as shown below where the values of Li, B and Si are the atomic percent with regards to Li:B:Si:
1. Li=80.9, B=7.56, Si=11.5
2. Li=79.6, B=13.7, Si=6.7
3. Li=78.5, B=9.6, Si=11.87
4. Li=77.73, B=10.07, Si=12.19
5. Li=76.89, B=10.55, Si=12.56
6. Li=76.14, B=10.98, Si=12.88
7. Li=75.30, B=11.46, Si=13.24
8. Li=74.54, B=11.89, Si=13.58
9. Li=73.16, B=12.62, Si=14.22
10. Li=71.86, B=13.31, Si=14.83
11. Li=70.41, B=14.07, Si=15.51
12. Li=69.12, B=14.76, Si=16.12;
with oxygen present in amounts to form oxides and maintain charge neutrality.

The LiBSiO compositions exhibited electrochemical stability across potentials ranging from 0 to 5 V when deposited on top of a platinum coated substrate, acting as the bottom electrode, with the top electrode being deposited on top of the lithium borosilicate electrolyte and composed of either nickel or platinum. One representative sample was selected and tested and found to exhibit electrochemical stability across potentials ranging from 0 to 10 V.

The technical effect of this discovery is that for the lithium borosilicate compositions as described herein, it may be possible to use the materials in solid state battery compositions operating at very high voltages delivering high power densities.

Example 7—Electronic and Ionic Conductivities

The electronic and ionic conductivities for a range of compositions in the LiBSiO system were measured as a function of lithium content (approx. 69-79% lithium as based on components Li, B and Si). Ionic conductivity values were determined from impedance measurements performed using a Solartron 1260 frequency response analyzer between 1 MHz and 1 Hz using a 100 mV ac potential, one second integration per frequency, with seven frequency points measured per decade. Conductivity values were calculated by fitting of the experimental data using an equivalent circuit model constructed in the ZView software program to determine the real-part of the resistance, associated with the thin film electrolyte, which was then used in combination with the geometric factor to determine the ionic conductivity. Electronic conductivity values were determined using a Keithley Series 2636 sourcemeter. A DC potential of 1 V was applied across the samples' electrodes for 65 hours with the steady state current, applied voltage, and geometric factor used to calculate the electronic conductivity values. Measurement of the electronic conductivity values was carried out in a Faraday cage enclosure. The electronic conductivity was between $1.84 \times 10^{-14}$ and $4.40 \times 10^{-14}$ S/cm and ionic conductivity was between $8.74 \times 10^{-7}$ and $5.72 \times 10^{-6}$ S/cm.

The technical effect of this discovery is that the electronic conductivity is sufficiently low that the LiBSiO glass electrolytes can be used in solid state batteries having very low theoretical capacity (<0.5 μAh), based on their ability to maintain the charged state, due to the very low electronic conductivity properties ($<7 \times 10^{-14}$ S/cm).

Example 8—Utilization of Cathode Material Coated with LiBSiO

Figure 6:
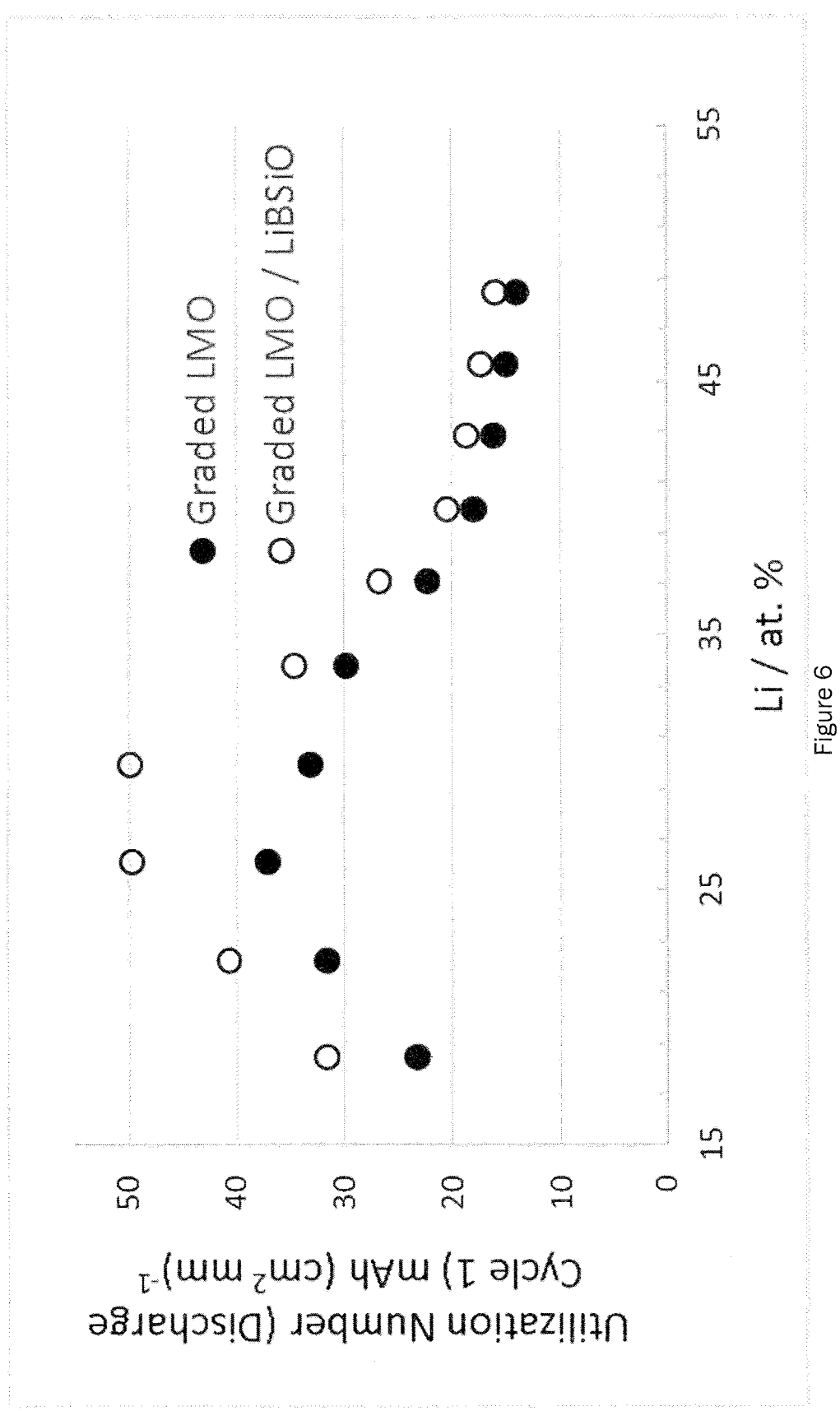
FIG. 6. Utilization number (Y axis) of the 1st discharge of LiBSiO coated (open circles) vs uncoated (solid squares) LMO cathode samples as a function of the atomic percent Li in the LMO (X axis).

FIG. 6 show the utilization number (Y axis) of the 1st discharge of LiBSiO coated (open circles) vs uncoated (solid circles) LMO cathode samples as a function of the atomic percent Li in the LMO (X axis), Data from which the plot was produced from a 10×10 array of Pt electrodes on to which discrete fields of LMO having lithium contents between 18.38 and 48.43 at. % lithium, as determined from the Li and Mn components of the LMO films were deposited. The LMO active cathode material deposited on the underlying Pt current collectors was deposited from the elements onto a substrate maintained at 450° C., with the lithium and the manganese fluxes originating from Knudsen cell sources and the oxygen supplied by a plasma source with a flow rate of $O_2$ of 3.5 sccm and a power of 500 W. The substrate comprising the array of individual LMO sample fields were treated under $O_2$ to 550° C. for two hours prior to the deposition of the LiBSiO coating on the test samples. The LiBSiO film was deposited on seven of the ten rows while the fields of the three remaining rows remained uncoated. The array of electrodes was subjected to electrochemically testing by cyclic voltammetry using an in-house potentiostat. The voltage range was between 3.25 V and 4.75 V, with a scan rate of 0.104 mV/sec. The counter-reference electrode was a piece of 0.5 mm thick lithium foil and the electrolyte comprised 1 M $LiPF_6$ in EC:DMC (1:1). The data used to generate the graph were processed by first averaging all compositionally equivalent sites on the sample (seven per composition for those with LiBSiO and three per composition without LiBSiO unless null values were present due to electrode failure), then by taking the average of all values falling within one standard deviation of that average.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry and materials science or related fields are intended to be within the scope of the following claims.

The invention claimed is:

1. A battery comprising a positive electrode, a negative electrode, and an electrolyte between said positive electrode and said negative electrode, wherein said positive electrode comprises a positive electrode active material selected from the group consisting of $LiCoPO_4$, $LiMnPO_4$, $LiFePO_4$, $LiNiPO_4$, $Li_2NiPO_4F$, $Li_2CoPO_4F$, $LiMnPO_4F$, $Li_2CoSiO_4$, $Li_2MnSiO_4$, $FeF_3$, $LiMn_{0.8}Fe_{0.1}Ni_{0.1}PO_4$, $Li_{1-x}VOPO_4$, and $Li_2FePO_4F$, and wherein said electrolyte is a lithium borosilicate composition consisting essentially of a system of lithium oxide in combination with silicon oxide and boron oxide, wherein said lithium borosilicate comprises between 70-83 atomic % lithium based on the combined atomic percentages of lithium, boron and silicon, and wherein said lithium borosilicate is a glass.

2. The battery of claim 1, wherein said negative electrode comprises a negative electrode active material selected from the group consisting of lithium, silicon, tin, magnesium, aluminum antimony, and carbon.

3. The battery of claim 1, wherein the negative electrode active material is lithium.

* * * * *